United States Patent [19]

Stockburger et al.

[11] Patent Number: 5,818,383
[45] Date of Patent: Oct. 6, 1998

[54] INTERFEROMETRIC MOVING VEHICLE IMAGING APPARATUS AND METHOD

[75] Inventors: Edward F. Stockburger, North Caldwell, N.J.; Hugh D. Holt, Jr., West Redding, Conn.; Daniel N. Held, Fairfield, Conn.; Robert A. Guarino, Monroe, Conn.

[73] Assignee: Northrop Grumman Corporation, Los Angeles, Calif.

[21] Appl. No.: 331,076

[22] Filed: Oct. 28, 1994

Related U.S. Application Data

[63] Continuation-in-part of Ser. No. 325,522, Nov. 27, 1981, Pat. No. 5,559,516.

[51] Int. Cl.$^6$ .................................................. G01S 13/58
[52] U.S. Cl. ........................................ 342/109; 342/161
[58] Field of Search .................................... 342/104, 107, 342/108, 109, 156, 161, 179

[56] References Cited

U.S. PATENT DOCUMENTS

| | | |
|---|---|---|
| 3,735,400 | 5/1973 | Sletten et al. . |
| 4,132,990 | 1/1979 | Di Domizio et al. . |
| 4,170,774 | 10/1979 | Schaefer . |
| 4,321,601 | 3/1982 | Richman . |
| 4,549,184 | 10/1985 | Boles et al. . |
| 4,706,088 | 11/1987 | Weindling . |
| 5,122,803 | 6/1992 | Stann et al. . |
| 5,243,349 | 9/1993 | Mims . |
| 5,243,351 | 9/1993 | Rafanelli et al. . |
| 5,579,011 | 11/1996 | Smrek . |

OTHER PUBLICATIONS

A Radar Signal Processor For Space–Based Radar, T. Nohara et al., pp. 12–16.
MTI and Pulse Doppler Radar, Introduction to Radar Systems, Second Edition, Merrill I. Skolnik, 1980, pp. 139–147.
Radar Clutter, Introduction to Radar Systems, Second Edition, Merrill I. Skolnik, 1980, pp. 497–499.
Other Radar Topics, Introduction to Radar System, Second Second Edition, Merrill I. Skolnik, 1980, pp. 517–529.
Introduction, Synthetic Aperture Radar, John J. Kovaly, 1976, pp. 1–20.
An Introduction to Synthetic Aperture Radar, W.M. Brown and L.J. Porcello, IEEE Spectrum (Sep. 1969) pp. 52–62.
Synthetic Aperture Imaging Radar and Moving Targets, R.K. Raney IEEE Transactions on Aerospace and Electronic Systems, vol. AES–7, No. 3 (May 1971), pp. 499–505.
The Effect of Normally Distributed Ramcom Phase Errors on Synthetic Array Gain Patterns, C.A.Greene et al. IRE Transactions on Military Elect. vol. MIL–6, No. 2 (Apr. 1962) pp. 130–139.
Synthetic Aperture Imaging with Maneuvers, J.H. MIMS et al., IEEE Transactions on Aerospace and Elect. Sys. vol. AES–8, No. 4 pp. 410–418, (Jul. 1972).
Synthetic Aperture Processing with Limited Storage and Presumming, W.M. Brown et al., IEEE Transactions on Aerospace and Elect. Sys. vol. AES–9, No. 2 (Mar. 1973) pp. 166–176.
Synthetic Interferometer Radar for Topographic Mapping, L.C. Graham, Proceedings of the IEEE, vol. 62, No. 6 (Jun. 1974), pp. 763–768.

*Primary Examiner*—Theodore M. Blum
*Attorney, Agent, or Firm*—Walter G. Sutcliff

[57] ABSTRACT

An interferometric moving target radar imaging system includes a plurality of simultaneously operating apertures, receivers and processing channels which together coherently process RF return signals to image a moving vehicle. The system corrects for the different phase centers of the apertures and interferometrically combines the return signals from different apertures to attenuate the energy from stationary objects. The true azimuth location of the moving vehicle within main beam clutter spread is then determined which facilitates distinguishing between slow moving and stationary objects to detect the moving objects which are then tracked and imaged in the range doppler domain.

29 Claims, 14 Drawing Sheets

FIG. 11
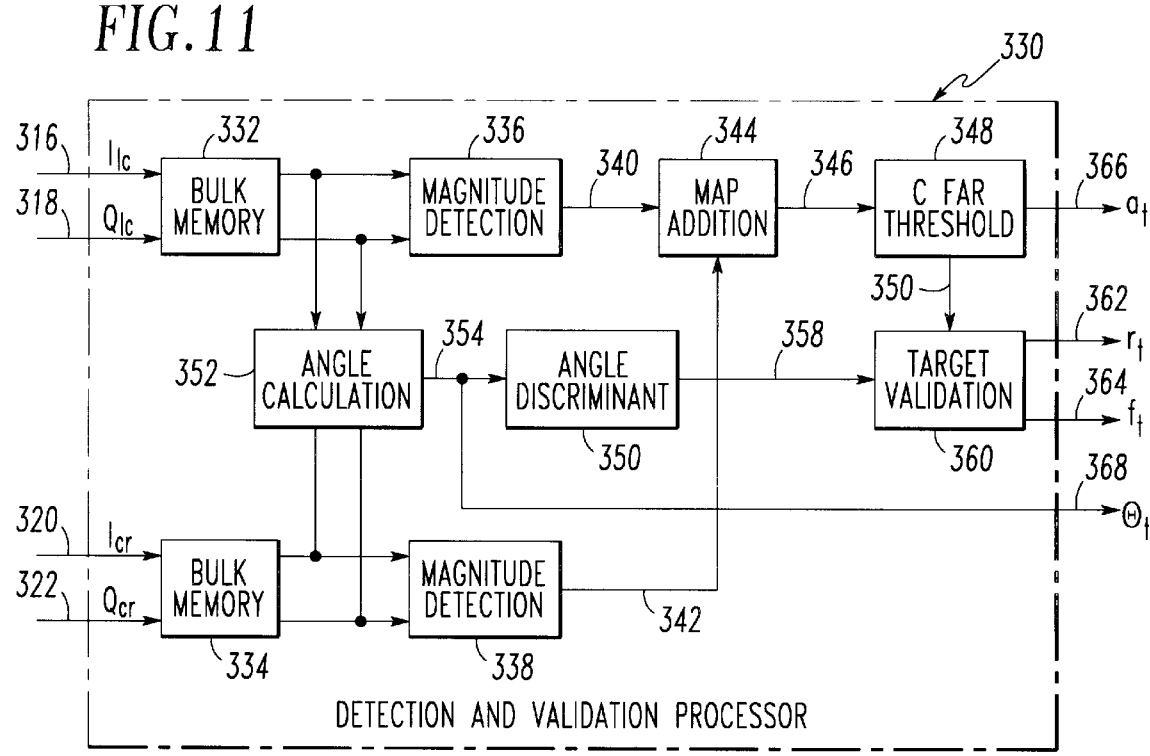
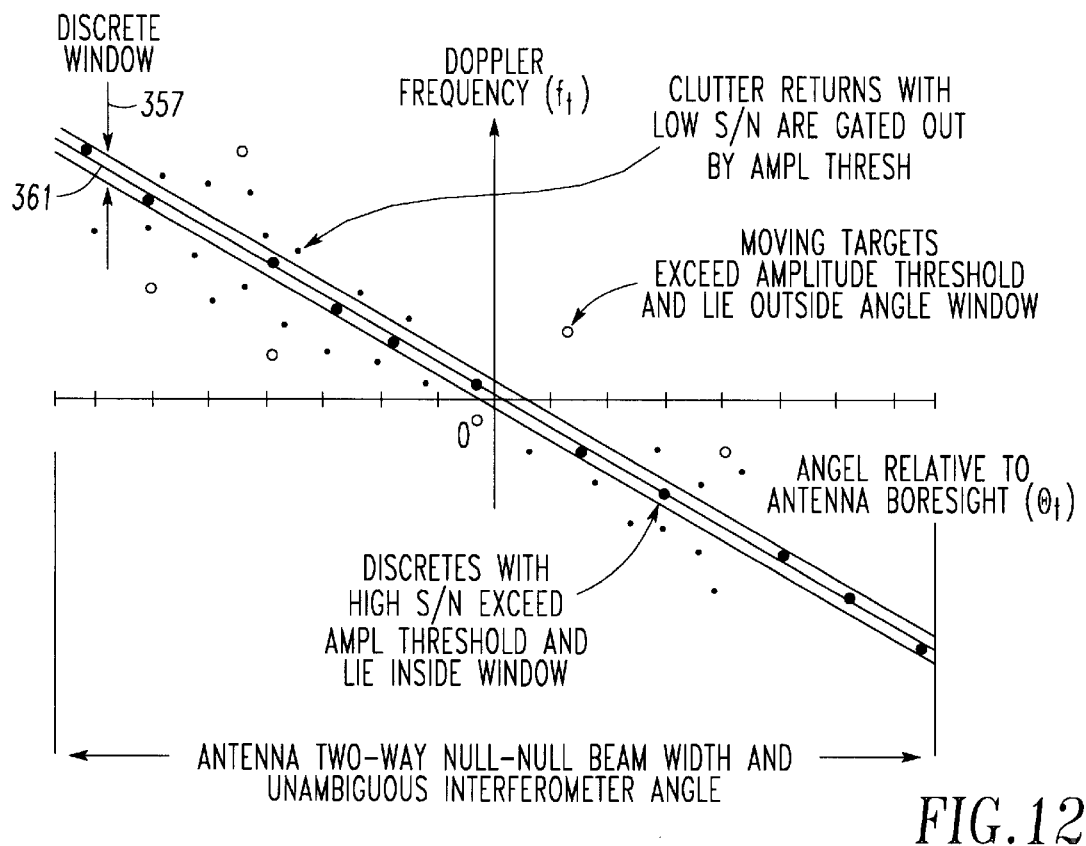
FIG. 12

FIG. 13
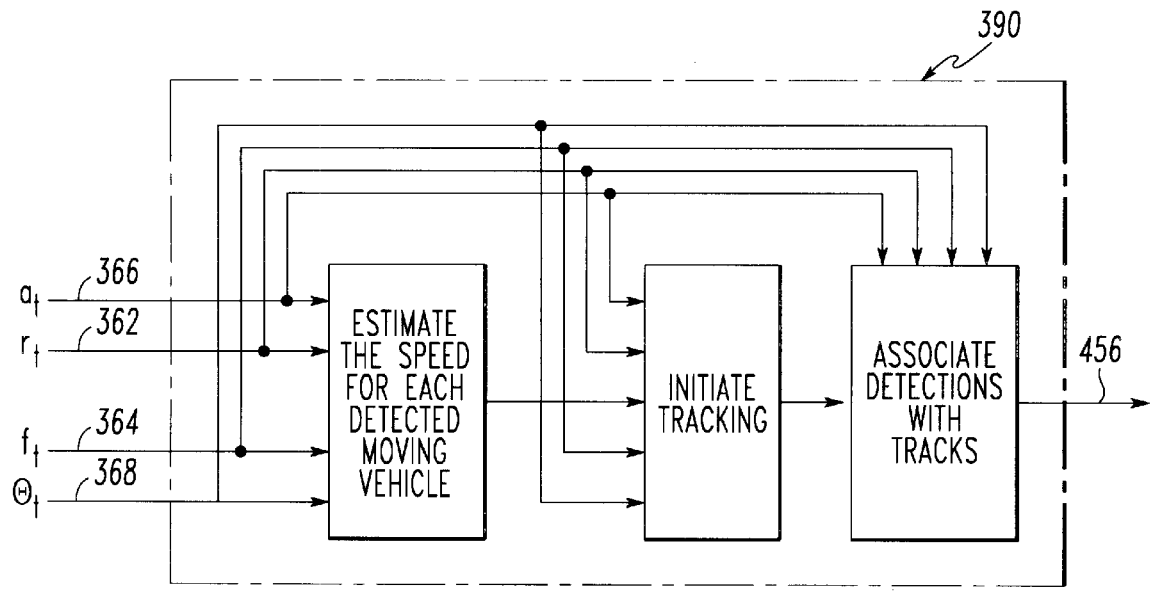
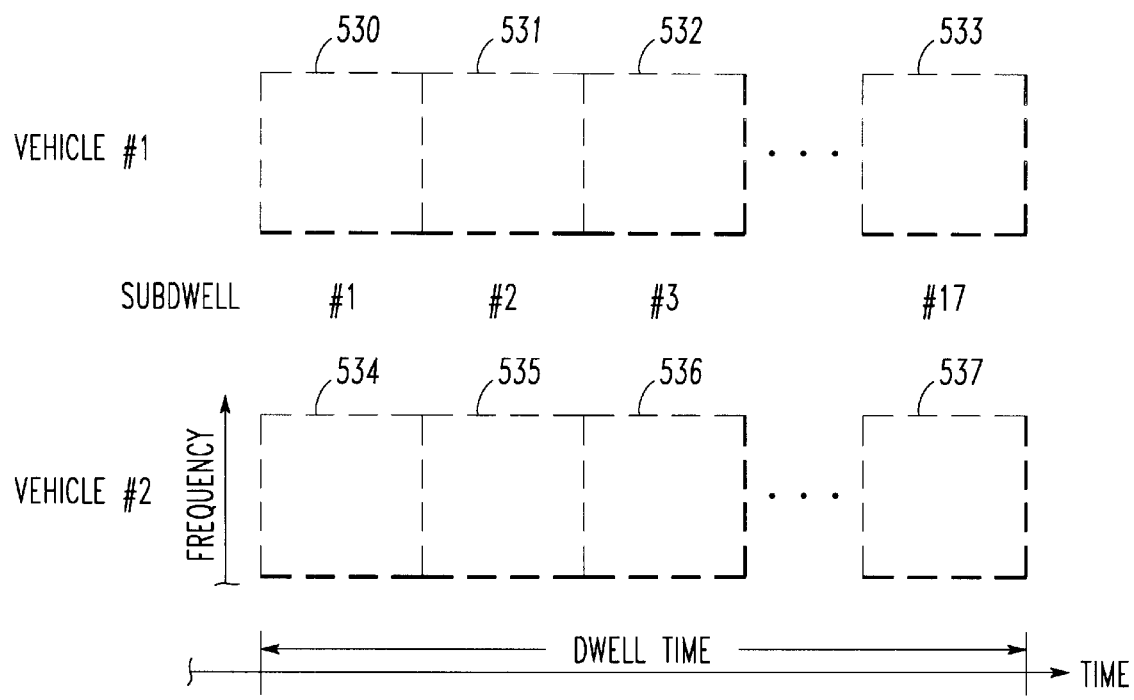
FIG. 16

FIG. 15
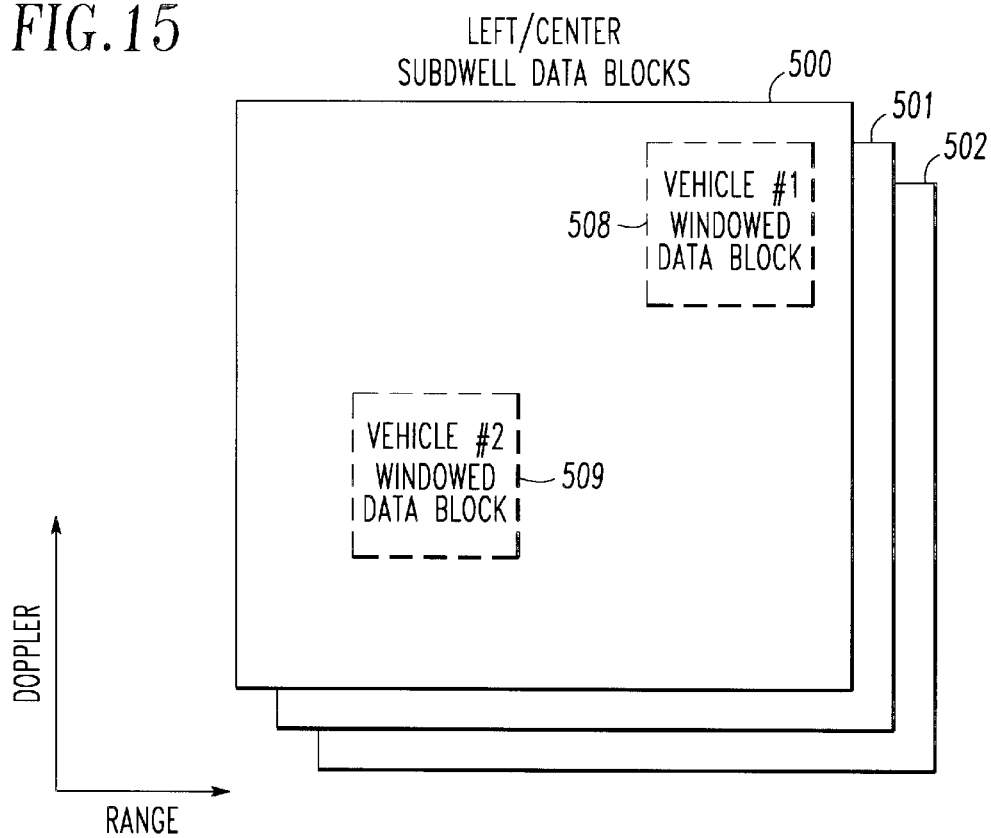
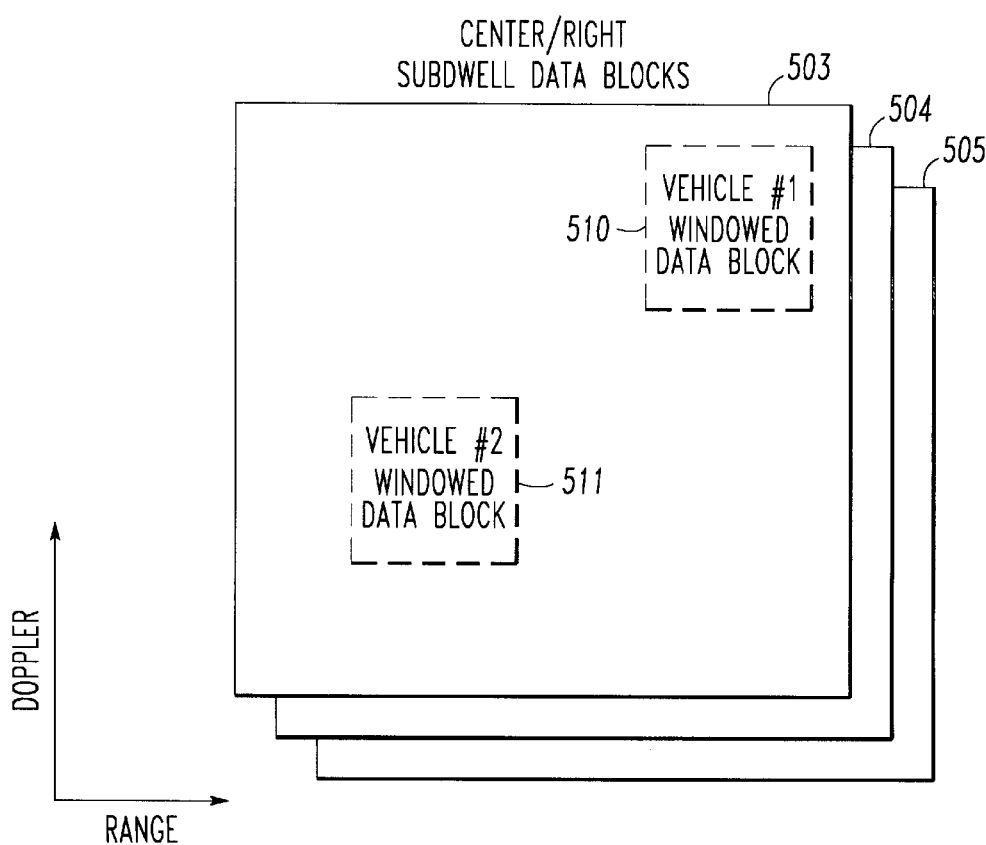

INTERFEROMETRIC MOVING VEHICLE IMAGING APPARATUS AND METHOD

CROSS REFERENCE TO RELATED APPLICATIONS

This application is a continuation-in-part of application Ser. No. 325,522 filed Nov. 27, 1981, now U.S. Pat. No. 5,559,516, designated attorney docket number N-1033, entitled "Dual Cancellation Interferometric AMTI Radar".

This application also contains subject matter related to the following commonly assigned, co-pending U.S. patent applications: Ser. No. 325,523 filed Nov. 27, 1981, attorney docket number N-1052, entitled "Maximized/Minimized Phase Calculator For an Interferometric AMTI Radar now U.S. Pat. No. 5,559,517; Ser. No. 325,524 filed Nov. 27, 1981, attorney docket number N-1054, entitled "Low Target Velocity Interferometric AMTI Radar" now U.S. Pat. No. 5,559,518; Ser. No. 325,521 filed Nov. 27, 1981, attorney docket number N-997, entitled "Channel Switching Interferometric AMTI Radar" now U.S. Pat. No. 5,559,515.

TECHNICAL FIELD

This invention relates to radar signal processing, and more particularly to imaging ground moving vehicles using an interferometric synthetic aperture radar.

BACKGROUND ART

Air-to-ground radar systems often work in an airborne moving target indicator (AMTI) mode or a synthetic aperture radar (SAR) mode. The AMTI mode is used to detect, locate and track moving objects while the SAR mode is generally used to image stationary objects.

SAR signal processing to form an image is well known. As an example, see., "Synthetic Aperture Radar", by J. J. Kovaly, published by Artech House, Inc., Dedham, Mass. 1976 (a collection of thirty-three reprinted technical papers on the various aspects of SAR). SAR is an all-weather imaging radar system which provides a high resolution image in both the range dimension and the cross range dimension. Range resolution is achieved in a well known manner by using either a high bandwidth fixed frequency transmit pulse or a frequency modulated (FM) transmit pulse. Resolution in the cross range dimension is achieved by synthesizing a large antenna aperture.

In a conventional non-synthetic aperture radar system, resolution in the cross range dimension is:

$$\delta_{cr} = R\theta_B \quad \text{(Eq. 1)}$$

where:
$\delta_{cr}$=cross range resolution
R=range
$\theta_B$=beamwidth of the transmitted signal in radians
Therefore, to improve the cross range resolution $\delta_{cr}$ the beamwidth $\theta_B$ must be decreased. $\theta_B$ is defined as:

$$\theta_B = (k\lambda)/D \quad \text{(Eq. 2)}$$

where:
k=constant
$\lambda$=wavelength of the transmitted signal (i.e., $c/f_c$)
D=antenna width
c=speed of light
$f_c$=carrier frequency
Substituting Eq. 2 into Eq. 1, one can see that for improved cross range resolution $\delta_{cr}$ the radar designer can either increase the antenna width D, or decrease the wavelength $\lambda$. However, there are clearly limits on how large the antenna width D can get (especially on an airborne platform) to achieve cross range resolution satisfactory for imaging. Similarly, the wavelength $\lambda$ can be decreased only so far before it becomes so short that the radar system's performance becomes degraded in foul weather conditions (e.g., rain, snow and sleet). SAR solves this problem by employing signal processing techniques which allow a larger antenna of size D' to be synthesized using the motion of the radar platform (e.g., an antenna mounted on a aircraft). That is, SAR achieves high cross range resolution by using motion of the vehicle carrying the radar to generate a synthesized antenna of size D' sequentially rather than simultaneously as is the case with a real antenna of the same size. The key to SAR is the data processing of stored reflected return data, and the amplitude weighting, phase shifting and coherently summing of the data to form the synthetic aperture radar antenna of length D'. For an overview of SAR see "An Introduction to Synthetic Aperture Radar" by W. M. Brown and L. J. Porcello, *IEEE Spectrum* (September 1969) pages 52–62.

In radar signal processing, moving and stationary objects are distinguished based upon the well known doppler principle that if a radar system illuminates an object with a pulse of RF energy having a carrier frequency $f_c$, the return signal will have a frequency value of $f_c-f_d$ where the value of $f_d$, defined as the doppler frequency shift, varies as a function of the object's velocity component toward or away from the radar transmitter. If both the target and the radar system transmitting the RF energy are stationary, then the value of the doppler frequency $f_d$ will be zero. If either the object or the radar platform is moving relative to one another, then $f_d$ will be have a non-zero value indicative of velocity.

When the radar itself is in motion (which is the case for an aircraft radar system), distinguishing between moving targets and stationary objects is more difficult. The doppler frequency shift $f_d$ for the clutter (i.e., stationary objects) is no longer zero, since the clutter is moving with respect to the radar. This is a particularly troublesome problem for slow moving objects e.g., a truck traveling at about 10 mph. For a detailed discussion of the problems associated with imaging moving vehicles, see the *GEC Journal of Research*, Vol. 5, No. 2, pages 106–115, entitled "Synthetic Aperture Radar (SAR) Images of Moving Vehicles" by A. Freeman and A. Currie.

An attempt to address some of the issues relating to ground moving vehicle imaging using SAR techniques is presented in U.S. Pat. No. 5,122,803 by B. Stan and P. Alexander entitled "Moving Vehicle Imaging Synthetic Aperture Radar". While the approach discussed by Stan and Alexander theoretically may be used to image moving vehicles, its implementation is impractical in a real-time system because moving vehicles are not detected until after the entire velocity space has been searched for the vehicle. Such a search is computationally demanding and overly burdensome in a real-time system. Furthermore, output image quality of the moving vehicle is poor because they assume that the vehicle motion during the time period the radar is imaging the vehicle (often referred to as the dwell period) is purely linear. Any deviation from a straight line (which is virtually guaranteed for any practical imaging scenario) causes image blurring. Therefore, although radar imaging of ground moving vehicles has been discussed, its implementation has remained unrealizable in a real-time system prior to the present invention.

As a result of the SAR's inability to adequately image moving vehicles, electro-optic imaging systems (e.g., a FLIR) are often used to image detected moving objects (e.g., cars, buses, ships, etc.). However, electro-optic imaging systems are plagued by a much shorter effective range in comparison to radar, and also they provide a much narrower azimuth viewing area, so narrow in fact that operators have commented that using an electro-optic imaging system is like looking through a straw. In addition, the operational ability of an electro-optic imaging system is degraded in rain, snow, fog and smoke when the imaging system is needed most.

DISCLOSURE OF THE INVENTION

An object of the present invention is to provide a radar system having the ability to image moving vehicles, including "slow moving" ground vehicles.

Another object of the present invention is to provide a radar system capable of imaging moving vehicles within heavy clutter in real time.

A further object of the present invention is to provide a coherent pulse doppler synthetic aperture radar system capable of developing at high resolution, specific vehicle signatures.

An object of the present invention is to provide a radar system having improved clutter cancellation ability along with the ability to provide long dwell times on a vehicle to enhance the system's doppler resolution.

Yet another object of the present invention is to provide a radar system with the ability to accurately determine a moving vehicle's azimuth location versus time and its ground speed in order to track the vehicle.

According to the present invention, an interferometric moving target imaging system includes a plurality of simultaneously operating apertures, receivers and processing channels which together coherently process RF return signals to image a moving vehicle by correcting for the different phase centers of the apertures and interferometrically combining the return signals from different apertures which attenuates the energy from stationary objects, the true azimuth location of the moving vehicle within main beam clutter spread is then determined which facilitates distinguishing slow moving vehicles from stationary objects to detect the moving objects which are then tracked and imaged in the range doppler domain.

The present invention employs an interferometric synthetic aperture radar system containing novel signal processing techniques which allow for the detection, location, tracking and imaging of ground moving vehicles. The present invention is capable of imaging both ground moving targets and ships. The term "slow moving" as used herein, corresponds to a vehicle having a certain velocity such that the doppler from the return signals for the vehicle are contained within the main beam doppler clutter spread. That is, return energy from the vehicle is mapped into the same range/doppler cell as ground clutter, making the detection of the moving object in the presence of the ground clutter difficult.

In order to image a moving vehicle, the interferometric SAR system must be able to detect, locate and track the moving target in a coherent manner over the entire dwell period. The present invention uses an interferometric radar system to interferometrically process return signals from a plurality of apertures to significantly attenuate the energy associated with ground clutter allowing the radar system to more accurately track the moving vehicle and estimate its azimuth location. The clutter cancellation techniques are so effective, that even slow moving ground vehicles which formerly were difficult or impossible to detect due to competing clutter energy in the same range/doppler cell can now be detected, located and tracked. This enables the improved imaging of the present invention. The term imaging as used herein does not necessarily refer to an image as crisp as a photographic image. A radar image in the range doppler domain, may be crude to the untrained eye, but provides sufficient detail to allow a trained user to distinguish various objects.

A preferred embodiment of the present invention is an interferometric synthetic aperture radar system which develops a composite image of a ground moving vehicle using doppler and range image data of the moving vehicle. Resolution in the range dimension is typically achieved by using a high bandwidth RF pulse (i.e., a narrow pulse-width) which is often created using pulse compression techniques. As an example, a high resolution system may use a pulse compressed two nanosecond pulse width to achieve a one foot range resolution. Resolution in the doppler dimension can be achieved by doppler filtering typically using Fast-Fourier-Transforms (FFTs) in which multiple scatterers within the same range cell are resolved by doppler differences produced by their unique line-of-sight relative motions. For vehicle imaging systems, dwell times may range from about 0.1 second (10 Hz doppler resolution) to about 10 second (0.1 Hz doppler resolution) or more. In general, the longer the dwell time the greater the doppler resolution which facilitates distinguishing between different types of slow moving targets. Similar to inverse synthetic aperture radar, the image produced by the interferometric SAR processing of the vehicle's range and doppler information is a function of the relative geometry and rotational motion of the vehicle with respect to the SAR platform.

Since a moving vehicle often includes multiple complex scattering surfaces which reflect RF energy resulting in glint and fading, the problem of isolating and tracking stable scatterers on the target throughout the dwell period is extremely difficult. The interferometric signal processing of the present invention addresses this problem in two ways: 1) by compensating for different phase centers of the apertures and interferometrically taking the difference between returns from adjacent apertures, energy from stationary objects is attenuated thereby facilitating the detection and tracking of a ground moving vehicle and 2) interferometric processing enables a relatively accurate estimation of the moving vehicle's azimuth location (due to an interferometric phase measurement) within the main beam doppler clutter spread. These two improvements act as the foundation which facilitates forming a range doppler image of a moving vehicle according to the present invention.

In a preferred embodiment, the airborne radar system of the present invention includes several apertures which together transmit a plurality of RF pulsed waveforms over a certain dwell period (e.g., several seconds) and receive back scattered RF energy indicative of the imaged scene including moving vehicles within the imaged scene and clutter. To image the moving vehicles, the received signal information for each of the apertures gathered during this dwell period is divided into multiple non-overlapping adjacent subdwells and each subdwell is batch processed in real-time to synthesize a large antenna aperture. The length of each subdwell is preferably on the order of about 0.1 to 1 second. A low cross range resolution image is then formed for each subdwell of the various channels by taking a 2-D FFT. The image from each channel will be slightly different, due to the spatial separation (i.e., different phase centers) between the interferometric antennas, which can also be viewed as a temporal change due to the time it takes the radar to travel the distance separating the apertures. The transformed subdwell information now in the range/doppler domain is input to a clutter cancellation function which attenuates the energy in each subdwell associated with ground clutter and stationary objects by correcting for different phase centers of adjacent apertures and then interferometrically combining the returns from adjacent apertures.

In a preferred embodiment having three apertures, two clutter canceled data blocks of subdwell information are provided and because of the interferometric clutter cancellation processing, the resulting clutter data blocks will be interferometric with respect to one another. The next step is to process the clutter canceled data blocks to detect moving vehicles within the scene by using 1) constant false alarm rate (CFAR) thresholding and 2) angle criteria. A vehicle's detection is then recorded, and estimates of the vehicle's range, doppler, range extent and doppler extent are then performed. The detected moving vehicles for each subdwell data block are then compared against the detected vehicles in the other subdwells data blocks to create a track file resulting in improved vehicle confidence along with improved estimates of vehicle parameters such as its range, doppler, range extent and doppler extent. Each detected moving vehicle (or selected moving vehicles) is then "windowed" and the energy for the selected vehicles of interest are then summed by coherently combining the left and right subdwell data blocks. The summed clutter canceled data block is transformed back to the frequency versus time domain using a cross range 2-D inverse FFT. A coarse range walk correction is then performed based upon the target track formation. A map drift correction is applied to reduce residual vehicle range walk during the dwell period followed by autofocusing using a technique such as the well known phase gradient autofocusing (PGA). Prior to transforming back to the range/doppler domain, a low sidelobe weighting/taper is applied to reduce the range and doppler sidelobes. The moving vehicle image can then be overlaid onto the image of the stationary objects in the SAR scene to provide a composite image of both the moving vehicles and the stationary objects within the scene. The image and other information provided by the system of the present invention may also be used by an automatic target recognition system.

An example of an interferometric SAR system is the AN/APG-76 multi-mode radar system with air-to-air and air-to-ground modes produced by Westinghouse Norden Systems, Inc. The interferometer air-to-ground modes of the AN/APG-76 may make it a very good platform upon which to add the moving vehicle imaging techniques disclosed herein. Such a system would be capable of detecting, locating and imaging ground moving vehicles and ships, and referencing/overlaying the moving vehicle images onto a simultaneously formed SAR image of the stationary objects within the SAR scene. This would allow an operator to use a single all-weather sensor (i.e., the interferometric SAR) to detect, locate, track and provide high resolution images of moving vehicles in real-time.

These and other objects, features and advantages of the present invention will become more apparent in light of the following detailed description of a preferred embodiment thereof, as illustrated in the accompanying drawings.

BRIEF DESCRIPTION OF THE DRAWINGS

FIG. 11 illustrates a block diagram of the detection and validation routine for detecting and locating moving vehicles;

FIG. 12 is a plot of azimuth angle versus doppler used to distinguish moving and stationary objects;

FIG. 13 is a functional block diagram of the tracking logic;

FIG. 15 is a pictorial illustration of the range doppler data blocks containing moving vehicle information for the left/center aperture interferometer and the center/right aperture interferometer;

FIG. 16 is a pictorial illustration of the "windowed" range doppler subdwell information in FIG. 15 temporally joined to create a longer dwell of moving vehicle image data.

BEST MODE FOR CARRYING OUT THE PRESENT INVENTION

Figure 1:
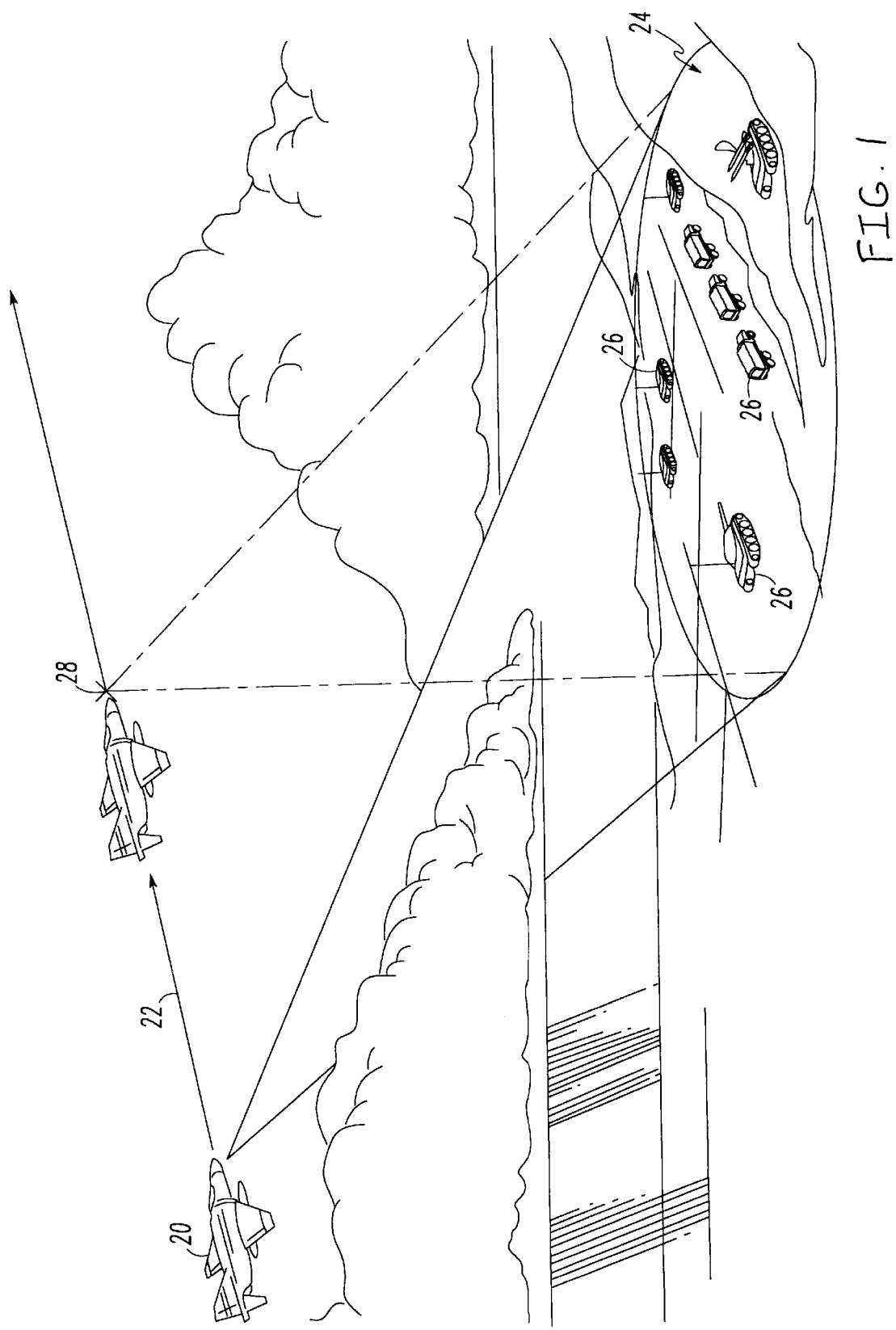
FIG. 1 is an illustration of an operational environment of the present invention.

An airborne synthetic aperture radar (SAR) system is typically used to map or image a specific ground terrain (also referred to herein as a SAR scene). As an example, FIG. 1 illustrates a SAR equipped aircraft 20 flying along a flight path 22 monitoring a certain SAR scene 24. The SAR equipped aircraft 20 transmits a series of RF pulses towards the SAR scene 24 and receives backscattered RF energy whose information content is indicative of the terrain and other reflecting objects 26 on the terrain (e.g., buildings, trucks, cars, ships, planes . . . ). A short time later the aircraft 20 is located at a second location 28 along the flight path 22 and again transmits RF energy towards the SAR scene 24. Note, with a SAR system the distance traveled by the aircraft between pulse transmissions should be less than one-half the illuminating aperture size when the radar's line of sight is perpendicular to the platforms velocity vector. The received RF energy at the second location 28 is again indicative of the SAR scene but this time it is taken from a different view. Since radar signals travel at a known velocity (i.e., the speed of light), it is known precisely when a return signal is likely to come from SAR scene 24 at a given range from the aircraft 20. Accordingly, for each transmitted RF pulse there will be a plurality of return signals corresponding to the various scatterers within the SAR scene located at various ranges from the aircraft. These returns can be processed in real-time or off-line to create an image of the SAR scene 24 and stationary objects 26 therein using the doppler history of the objects. That is, each return signal contains the radar carrier frequency signal $f_c$ component with a doppler shift in frequency ($f_c \pm f_d$) which in reality is the phase of the backscattered signal as a function of time with respect to the phase of the transmitted signal. According to the present invention, these returns can also be coherently processed to image the moving objects (e.g., cars, trucks, ships, etc. . . .) within the SAR scene 24.

Figure 2:
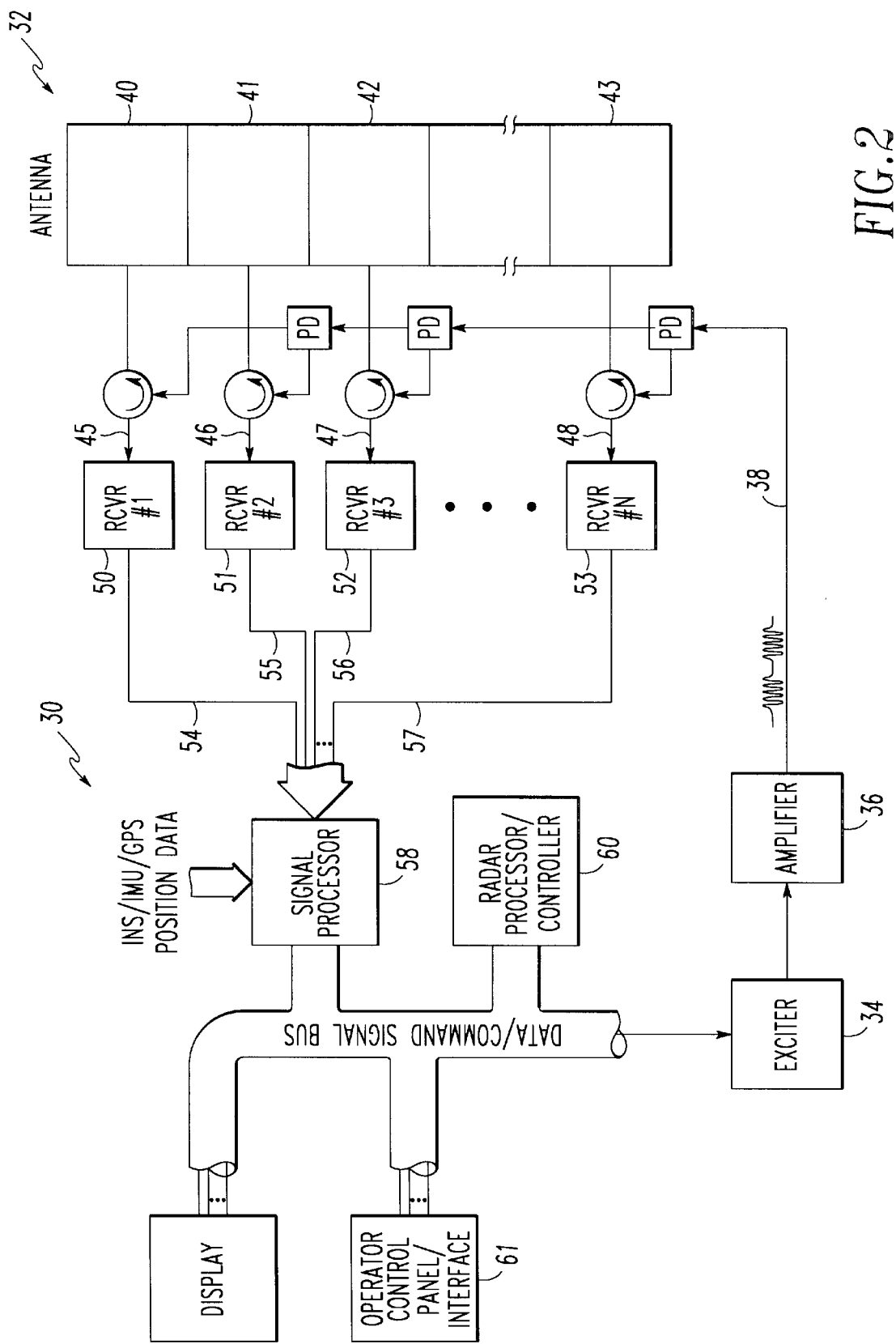
FIG. 2 is an illustration of a functional hardware block diagram of an interferometric synthetic aperture radar (SAR) for imaging ground moving and stationary vehicles.

Referring to FIG. 2, an interferometric SAR system 30 includes a multi-aperture antenna 32 which transmits pulsed RF energy (preferably X or Ku band) and receives backscattered RF energy from the illuminated SAR scene 24 (FIG. 1). The radar system 30 includes an exciter 34 and an amplifier 36 which generate and provide an uncompressed pulse of RF energy signal on a line 38 which is power divided and coupled to various apertures 40–43 of the antenna 32 which each radiate the RF energy. To obtain fine range resolution, a linear FM waveform is used in which frequency value $f_c$ is changed linearly from a frequency value $f_1$ to a value $f_2$ over the transmitted pulse length τ. This allows the radar to utilize a long pulse to achieve a large amount radiated energy while retaining the range resolution associated with a shorter pulse. Other known pulse compression techniques include nonlinear FM, discrete frequency shift, polyphase codes, phase coded pulse compression, compound Barker codes, coding sequences, complementary codes, pulse burst and stretch. During receive mode each of the apertures 40–43 independently receives the backscattered RF energy to create an azimuth interferometer. Each aperture 40–43 should be aligned with respect to one another in a relatively straight line parallel to the motion of the aircraft along the face of the antenna 32. It should be pointed out that as the distance separating the apertures 40–43 which form the interferometer increases, the better the performance of the system for measuring azimuth location of the target. In addition, each of the apertures is preferably used during transmit since it provides a higher transmit gain in comparison to if only one aperture was used.

Two or more receive apertures can be used to form an interferometer. However, for the present invention at least three receive apertures are preferred since the third aperture allows clutter to be attenuated out of each range/doppler filter for detection purposes while retaining the minimum of two clutter-canceled apertures that are required for accurate azimuth angle measurement. Two apertures are generally not satisfactory due to its inability to make unbiased measurements of the intra-beam location of a moving vehicle if the vehicle's range/doppler cell also contains returns from competing ground clutter. The clutter cancellation routine shall be discussed in greater detail hereinafter.

During receive mode each aperture 40–43 receives backscattered RF energy data indicative of the SAR scene 24 (FIG. 1) being imaged and provides a received signal on lines 45–48 respectively. Preferably, each aperture 40–43 has its own receiver 50–53 which allows parallel signal processing of the backscattered RF signal for each aperture 40–43. Each receiver 50–53 coherently processes its received signal data and provides received signals on lines 54–57 containing both in-phase(I) and quadrature(Q) data to a signal processor 58. A coherent reference signal is required for the signal processing since an azimuth angle measurement is a measurement of phase from spatially separate positions. That is, the coherent radar remembers the phase difference from transmission of a pulse to reception of the backscattered energy from the pulse. The received signals contain the carrier signal $f_c$ with a doppler shift $f_d$ in frequency, which in reality is its phase versus time. In general, each receiver 50–53 should be designed to maintain signal fidelity while retaining the spectral components of its corresponding backscattered RF signal.

The preferred implementation is to convert each backscattered RF signal to a digital signal format as early as possible in the signal processing sequence due to the greater degree of design flexibility inherent in the discrete time domain. This often occurs after the RF received signal has been bandshifted to an intermediate frequency (IF) and then to a video signal having both an in-phase(I) and quadrature (Q) component. The sampling rate of the analog-to-digital converter (ADC) (not shown) must be fast enough to meet the well known Nyquist sampling criteria to prevent alaising. Once sampled and digitized, the received video signal containing the I and Q signal components can be processed by the signal processor 58 to image moving vehicles within the SAR scene according to the present invention. A radar processor/controller 60 controls the operation of the radar system based upon inputs received from an operator control panel/interface 61 and the current operating condition of the radar system. Images formed by the present invention are presented on a display 62. The system may also include an automatic target recognition system 64 and a data link 66 such as an RF data link to another aircraft or a communications center.

Figure 3:
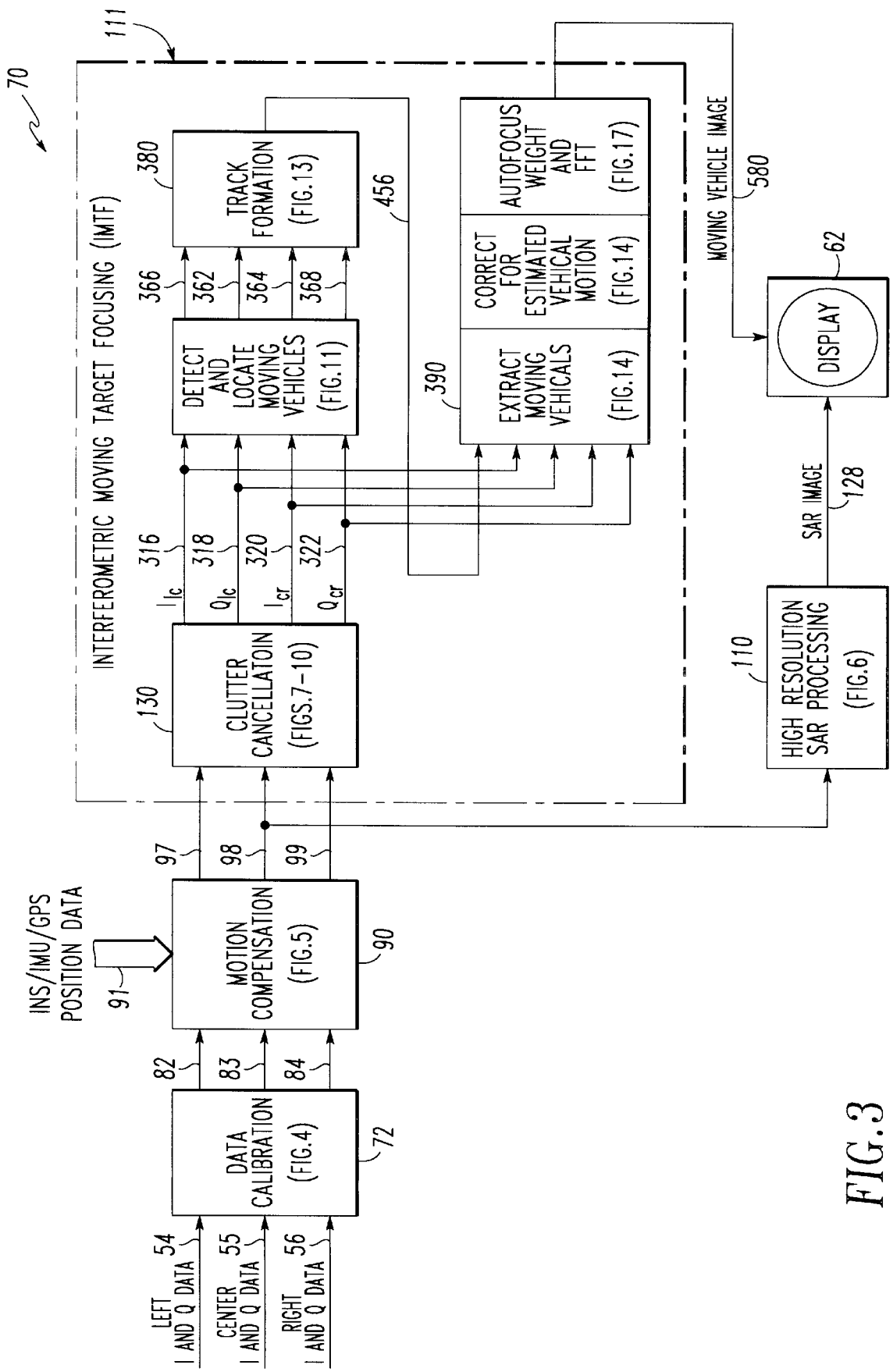
FIG. 3 illustrates a functional block diagram of the signal processing routines which the interferometric SAR system performs to image ground moving vehicles and stationary objects.

FIG. 3 illustrates a top-level functional block diagram of the signal processing routines 70 which can be performed either in real-time or off-line to image moving vehicles within the SAR scene. The preferred embodiment is a real-time execution of these routines within the signal processor 58 (FIG. 2) due to the operational benefits of providing real-time images of moving vehicles. To implement the routines in real-time, one skilled in the art will appreciate that the signal processor 58 requires a large amount of data storage and processing power. The processing steps of the present invention will now be presented based upon implementation of the signal processing routines in a pipelined processor architecture. The signal processing discussed herein will be based upon a system design employing a three aperture system (i.e., channels 1, 2 and 3 in FIG. 2).

Figure 4:
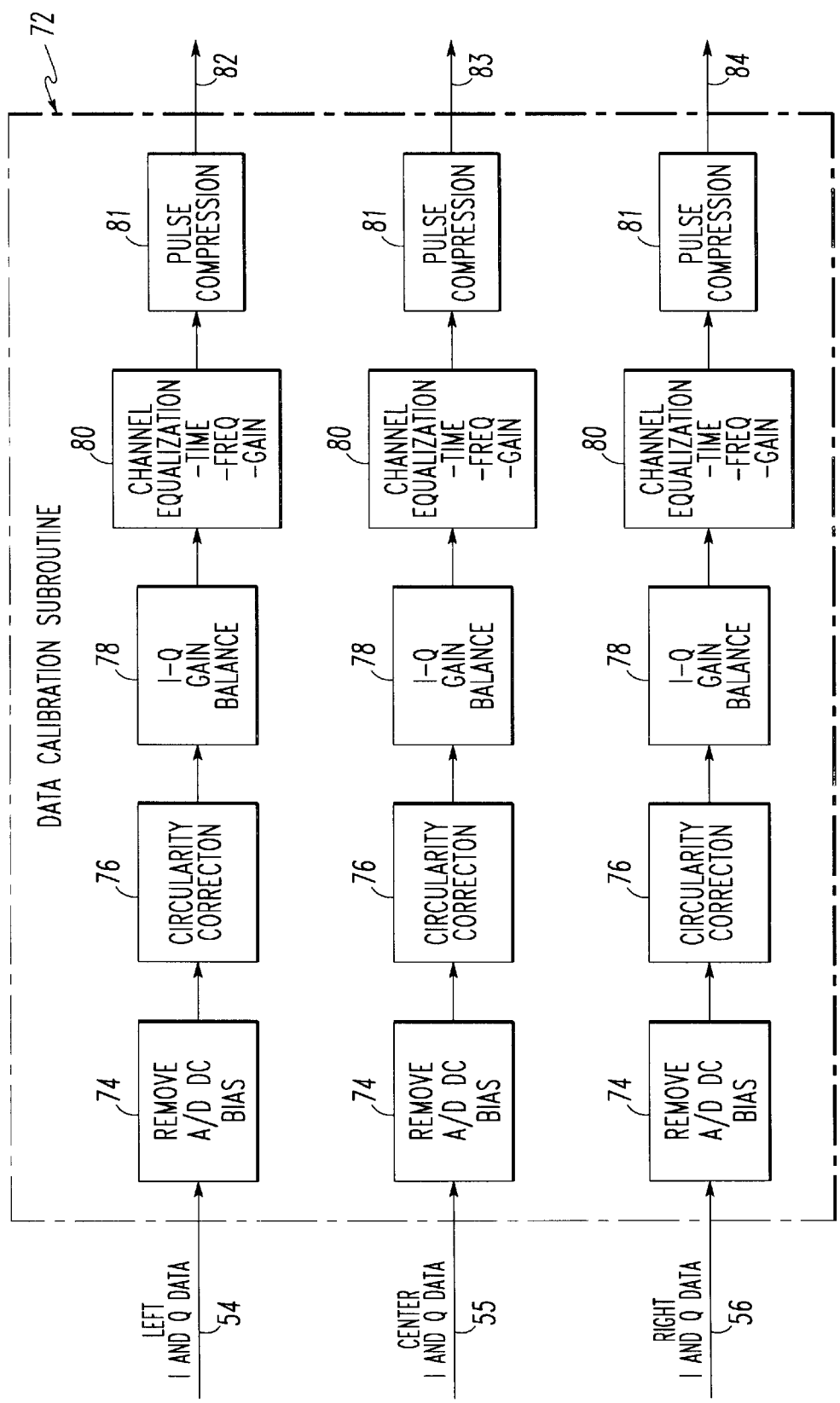
FIG. 4 illustrates a functional block diagram of the data calibration routine for each interferometer channel.

The first subroutine executed by the signal processor 58 is a data calibration routine 72 which receives the digitized in-phase(I) and quadrature(Q) signals on the lines 54–56 from the receivers 50–52 (FIG. 2) to correct for any front end hardware inaccuracies. FIG. 4 illustrates a block diagram of the data calibration routine 72 for the three interferometer channels. The processing steps for each channel includes subroutines to: i) remove the DC biases of the channel's ADC 74; ii) ensure that the inphase(I) and quadrature(Q) components of the signal are in true quadrature 76; iii) balance the I–Q gains and correct for receive chain mismatches including time alignment 78; and iv) gain and phase versus frequency alignment 80. The data calibration routines for each channel also includes a pulse compression subroutine 81 which provides compressed data in a well known manner in the frequency versus time domain. Pulse compression techniques used to increase the total RF energy while maintaining high range resolution are well known. Once complete, the data calibration routine 72 provides calibrated received signals on lines 82–84. In general, the data calibration routine 72 may include as many hardware receiver chain error corrections as necessary to reduce the amount of error introduced by the receivers 50–52 to an acceptable systems level. The next processing step is to motion compensate the calibrated received signals on the line 82–84.

Figure 5:
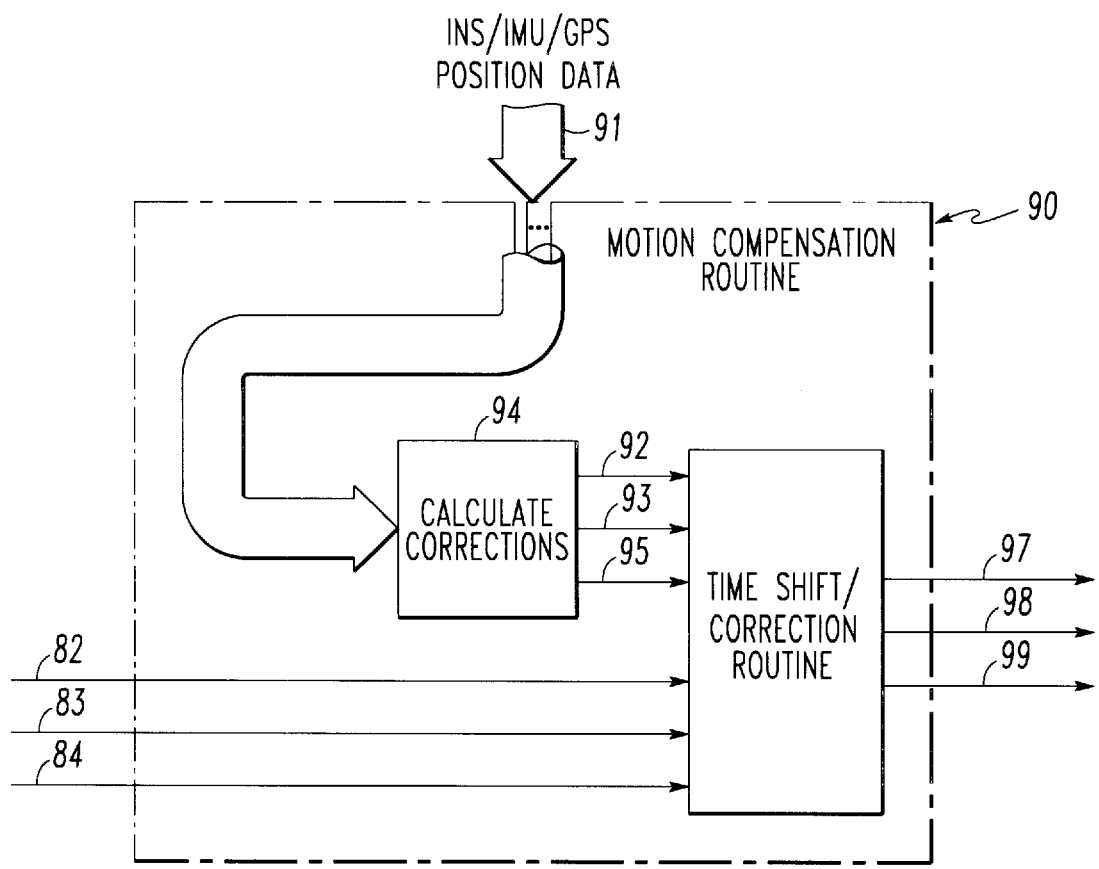
FIG. 5 illustrates a functional block diagram of the motion compensation routine.

FIG. 5 illustrates a functional block diagram of the motion compensation routine 90 which compensates for the aircraft motion with respect to the SAR scene 24 (FIG. 1). Because the aircraft is not flying on a perfectly straight line or at a constant velocity, the backscattered energy experiences a frequency shift and time delay both as a function of time which must be corrected to provide a coherent phase history of the stationary objects and moving vehicles during the dwell time. The dwell time as used herein is the period of time over which the radar system illuminates an area and generally is about 0.1 second to about 10 seconds or more. These corrections are required in a high resolution SAR in order to keep the individual scattering elements on a reflecting target resolvable over the dwell period and at squint angles other than 90°. In general, motion compensation is well known and involves electronically adjusting the phase of the received signals on lines 82–84. Ideally, the processed synthetic aperture information is completely isolated from the effects of undesired aircraft motion during the dwell time.

The distance the aperture has moved pulse to pulse is typically calculated based upon information obtained from an inertial navigation system (INS), an inertial measurement unit (IMU), and/or a global positioning system (GPS) (all not shown). The IMU is typically mounted on the antenna itself (e.g., on the flat plate) while the GPS and INS are often mounted elsewhere on the aircraft. The position measurement signals are provided on a plurality of data lines 91 and input to a calculate corrections subroutine 94 which computes and outputs correction signals on lines 92, 93, 95 for each aperture respectively. The value of the correction signals represents the amount of time delay to be applied to the calibrated received signals on lines 82–84 to provide motion compensated received signals on lines 97–99. Motion compensation can be performed several different ways and the technique selected is generally a function of the system's hardware. However, a preferred approach is to apply a complex phase ramp in the range frequency domain. The slope of the phase ramp is determined by the frequency step size (i.e., the change in frequency sample to sample) of the system and the change in the round trip path length of the RF energy pulse-to-pulse. A new time delay (i.e., a time shift) is applied for each pulse or synthesized pulse if multiple pulses are used to achieve the desired bandwidth using pulse compression techniques. The following papers discuss motion compensation and the details of performing the same: "Motion Compensation for Synthetic Aperture Radar" by J. C. Kirk, Jr, *IEEE Transaction on Aerospace and Electronic Systems*, Vol. AES-11, No. 3 (May 1975); "Synthetic Aperture Imaging With Maneuvers" by J. H. Minns and J. L. Farrell,); *IEEE Transactions on Aerospace and Electronic Systems*, Vol. AES-8, No. 4 (July 1972); and "Effects of Navigation Errors in Maneuvering SAR", by J. L. Farrell, J. H. Minns and A. Sorrell, *IEEE Transactions on Aerospace and Electronic Systems*, Vol. AES-9, No. 5 (September 1973).

Returning to FIG. 3, in the present form of the invention, a traditional SAR processing routine 110 images the stationary objects in the SAR scene 24 (FIG. 1), and an interferometric moving vehicle focusing (hereinafter "IMTF") routine 111 is used to image the ground moving vehicles within the SAR scene 24. In essence, the scene displayed to the operator on the display 62 is the composite of two images: i) the SAR routine 110 created image of the stationary objects and ii) the images of the moving vehicles formed by the IMTF routine 111. The SAR processing routine 110 and IMTF processing routine 111 shall be discussed separately.

SAR SIGNAL PROCESSING

Figure 6:
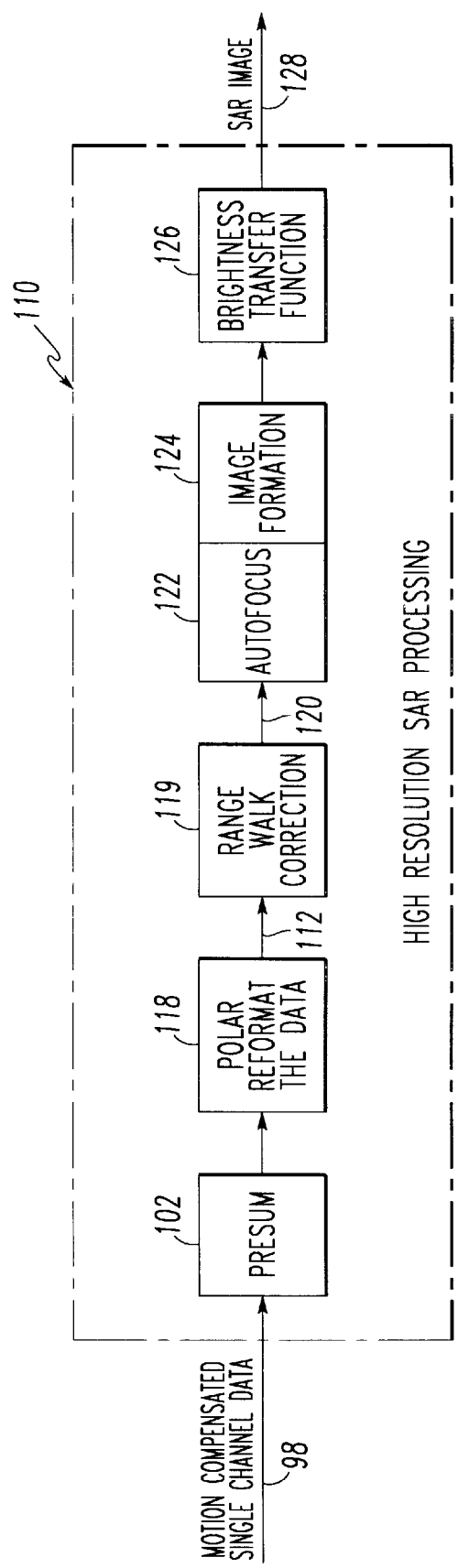
FIG. 6 illustrates a functional block diagram of the SAR signal processing routine for imaging stationary objects.

FIG. 6 illustrates a functional block diagram of a well known high resolution SAR processing routine 110 which creates an image of the stationary objects in SAR scene 24 (FIG. 1). The routine 110 receives the motion compensated received signal on the line 98 from one of the interferometer channels and subroutine 102 presumes the motion compensated received signal to create signal information which can be processed to form an image of the stationary objects in the SAR scene 24. Presumming may reduce the computational burden of SAR processing by narrow band filtering the azimuth samples (pulses) and reducing the sampling rate. This filtering may be performed by weighting the received signals on the line 98. Presumming is well known and discussed in "Synthetic Aperture Processing With Limited Storage and Presumming" by W. M. Brown, G. G. Houser and R. E. Jenkins; *IEEE Transactions on Aerospace and Electronic Systems*, Vol. AES-9, No. 2 (March 1973). Also see "A Discussion of Digital Signal Processing in Synthetic Aperture Radar" by J. C. Kirk, Jr., *IEEE Transactions on Aerospace and Electronic Systems*, Vol. AES-11, No. 3 (May 1975). In general, presumming is used to reduce the amount of data which is stored in main memory since the doppler bandwidth of the system may be larger than what is actually necessary to image the stationary objects in the SAR scene 24 (FIG. 1). Therefore, only the doppler band associated with stationary objects is retained for further processing. It should be pointed out, however, that data reduction should not be performed on the IMTF processed subdwells for the moving vehicles discussed hereinafter because in principal the location of the moving vehicles in the doppler space may not be known a priori. As a result, the processing load and temporary data storage requirements for IMTF processing are large in comparison to the requirements for SAR processing.

The next step in the high resolution SAR processing routine 110 is to polar reformat the pre-summed data to correct for the distortion of the scatterer's (i.e., an RF reflective surface) position about the center of the SAR scene (often referred to as the map center). A block of reformatted data is provided on a line 112 to subroutine 119 which corrects the reformatted data for fine range slip error which occurs due to the fact the INS is not infinitely accurate. The fine range slip correction value is adapatively computed by subroutine 119 and applied to prevent range walk by placing all the energy from the same scatter in the same range resolution cell. Range walk is the result of the stationary object "walking" through one or more range resolution cells during the dwell time. The fine range slip correction subroutine 119 then provides a corrected signal on a line 120 to an autofocus subroutine 122 which focuses the image of the stationary objects in the SAR scene. Subroutine 124 then forms the image of the stationary objects in the SAR scene which is enhanced by a brightness transfer subroutine (BTF) 126 that provides a SAR image signal on the line 128. The SAR image signal contains displayable quality images of the stationary objects (i.e., buildings, terrain and parked vehicles) in the SAR scene. SAR signal processing for imaging stationary objects is well known in the art, and therefore in the interest of brevity it has not been repeated here in detail. For details of SAR signal processing, see J. J. Kovaly, "Synthetic Aperture Radar", Artech House, Inc., Dedham, Mass. 1976 (a collection thirty three reprinted technical papers on various aspects of SAR).

INTERFEROMETRIC MOVING TARGET FOCUSING (IMTI)

Referring to FIG. 3, the IMTF signal processing routine 111 is designed to create a displayable quality range doppler image of moving vehicles which can be overlaid on the image of the static scene formed by the SAR processing subroutine 110 discussed above to form a complete range doppler image of both the moving and stationary objects within the SAR scene 24 (FIG. 1).

Figure 7:
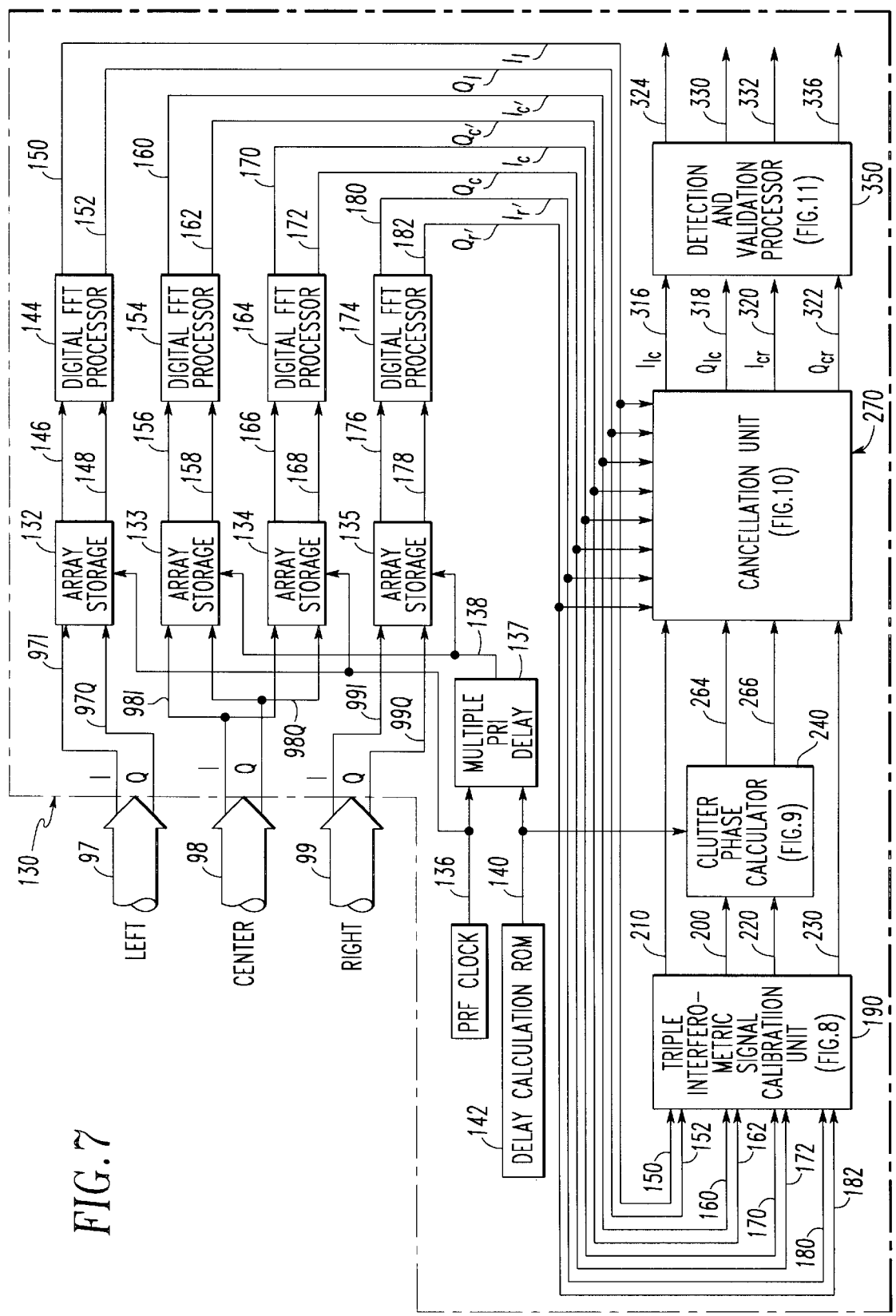
FIG. 7 illustrates a block diagram of the signal processing routines for canceling clutter.

FIG. 7 illustrates a block diagram of one embodiment of an interferometric clutter cancellation processing routine 130. The details of the clutter cancellation processing are disclosed in the following commonly assigned, co-pending U.S. patent applications: Ser. No. 325,522 filed Nov. 27, 1981, attorney docket number N-1033, entitled "Dual Cancellation Interferometric AMTI Radar"; Ser. No. 325,523 filed Nov. 27, 1981, attorney docket number N-1052, entitled "Maximized/Minimized Phase Calculator For an Interferometric AMTI Radar; Ser. No. 325,524 filed Nov. 27, 1981, attorney docket number N-1054, entitled "Low Target Velocity Interferometric AMTI Radar"; Ser. No. 325,521 filed Nov. 27, 1981, attorney docket number N-997, entitled "Channel Switching Interferometric AMTI Radar", all hereby incorporated by reference.

The motion compensated signals on the lines 97–99 are input to the clutter cancellation routine 130 and the I and Q signals for each channel are input to four bulk memory devices 132–135 used for array storage to create subdwells of pulse information which are batch processed. The motion compensated pulses are also partitioned into a number of non-overlapping data blocks (i.e., temporal subdwells of about 0.025 seconds to about 1 second of return data from multiple pulses). However, overlapping blocks may be used at the expense of larger memory and increased processing load, but with an advantage of improved ability to detect vehicles and reduce the effect of discontinuities when the subdwell data is pieced together in the final imagery of the moving vehicles in the SAR scene. The number of pulses stored in each subdwell data block is a trade-off parameter. As an example, increasing the number of pulses per subdwell generally improves the system's ability to cancel clutter while decreasing the ability to detect faster moving vehicles.

Unlike the high resolution SAR processing routine 110 which used data reduction, essentially all the received pulses are stored in the memory devices 132–135 rather than employing data reduction processing. Each memory device is of sufficient size to record $N_d$ pulse repetition intervals (PRIs) of return data for each of the $N_r$ range bins. Memory devices 133 and 134 accept data from the center aperture receiver, while memory device 132 accepts data from the left aperture and memory device 135 accepts data from the right aperture. A particular feature of the clutter cancellation processing is that the data in these memory devices is read in at different times. In other words, there are two separate time periods in which data is recorded, one for the left and center device together and the other for the right and the other center device together. A data gate signal on a line 136 controls the storage of left aperture data into memory device 132 and center aperture data into memory device 134. A second data gate signal on a line 138 controls the center and right aperture data storage. The data gate signal on the line 136 controls the storage of the first $N_d$ samples taken (i.e., samples 1 through $N_d$) for the left and center apertures, whereas, the second data gate signal on the line 138 allows the storage of $N_d$ samples of center and right aperture data delayed in time by N PRIs (i.e., samples 1+N through $N_d$+N) through the multiple PRI delay unit 137. The data gate delay 137 is controlled by the signal on a line 140 from the delay calculation read only memory (ROM) 142.

One feature of the clutter cancellation routine is that the multiple PRI delay for the optimum clutter attenuation is calculated in the delay calculation ROM 142. The delay calculation ROM 142 has three inputs: aircraft velocity $V_{aircraft}$, pulse repetition frequency (PRF) $f_r$ and inter-aperture spacing d (all not shown). The output of the delay calculation ROM 142 on the line 140 is the number of PRI delays N, which minimizes the value of the quantity $|(d/2V_{aircraft})-(N/f_r)|$. Since the inter-aperture spacing d is a constant for all signal sets and the number of different pulse repetition frequencies $f_r$ are limited, and the aircraft velocity $V_{aircraft}$ can be quantized to a low bit level, the output N will generally be a small set of numbers which can be represented by a simple digital code when stored in the ROM 142.

The clutter cancellation routine attenuates the energy from stationary objects by applying a phase correction value for all data points. Therefore, the return signal data has to be transformed to the frequency domain. Accordingly, a two dimensional digital FFT processor 144 receives the buffered subdwell I & Q information for the left aperture on lines 146 and 148 and transforms the time history contained therein to $I_l$ and $Q_l$ signals on lines 150 and 152 which provide a frequency domain representation of the received data. A second two dimensional FFT processor 154 is connected to the memory device 133 by lines 156, 158 and provides a comparable signal transformation to the frequency domain for signals $I_{c'}$ and $Q_{c'}$ on lines 160, 162. Two dimensional digital FFT processor 164 receives via lines 166 and 168 time domain return data and transforms the data into frequency domain signals $I_c$ and $Q_c$ output on lines 170, 172. In a similar manner, a two dimensional digital FFT processor 174 receives time domain data from the right aperture on lines 176 and 178, and provides frequency domain output signals $I_{r'}$ and $Q_{r'}$ on lines 180 and 182. The primed subscripts (e.g., $I_{c'}$) indicate delayed data sets, while the unprimed subscripts (e.g., $I_c$) indicate undelayed data sets. In other words, each FFT processor 144, 154, 164 and 174 converts the $N_d$ samples of the time history data, for each of the returns in the $N_r$ range bins, into the corresponding $N_d$ samples of frequency domain information. Therefore, at the output of each FFT processor we have the frequency characteristics for each range bin in the form of a range doppler map having $N_r$ range bins and $N_d$ distinguishable doppler values.

Figure 8:
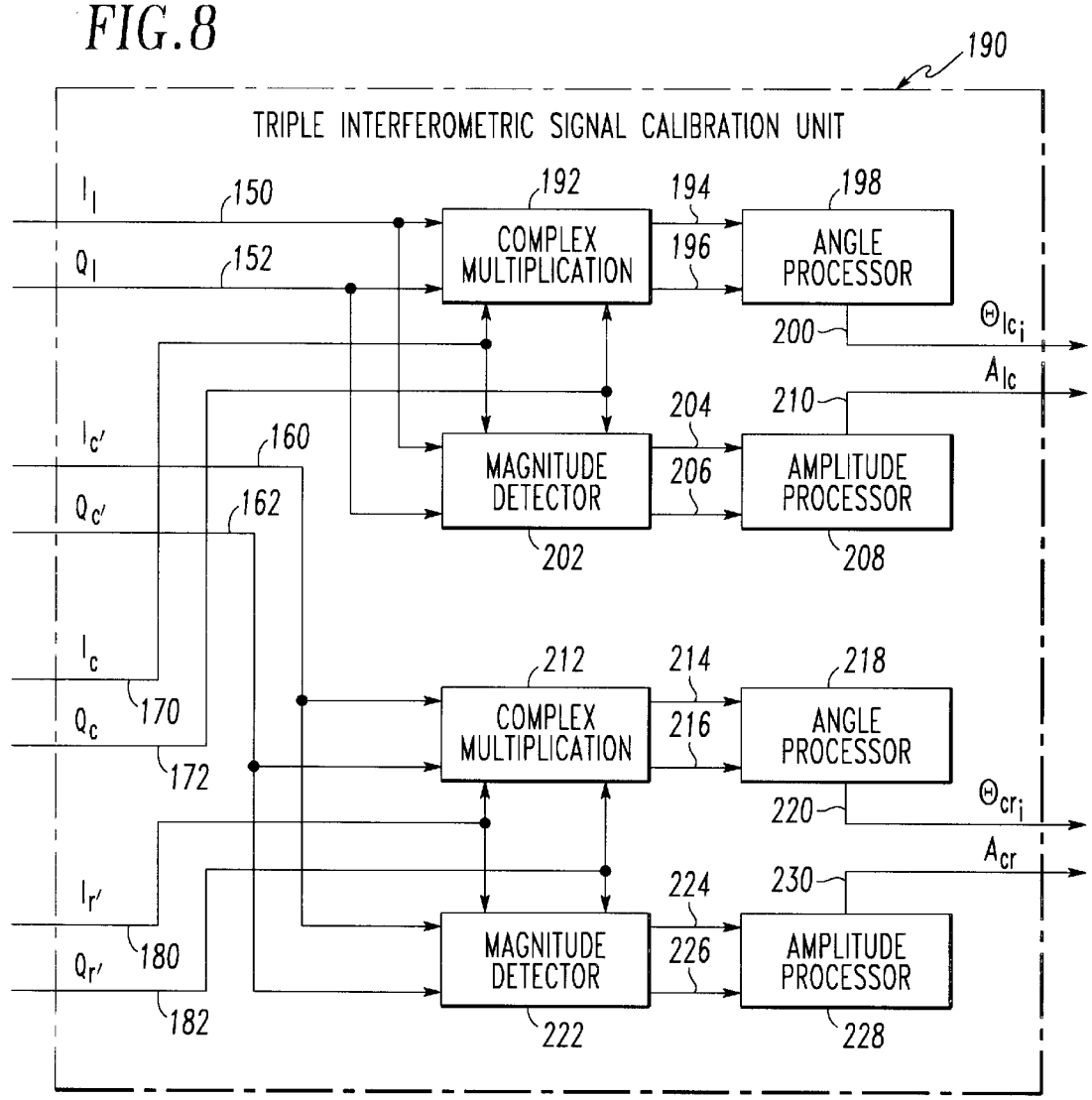
FIG. 8 illustrates a block diagram of the triple interferometric signal calibration routine which is part of the clutter cancellation processing in illustrated FIG. 7.

To attenuate the energy associated with stationary objects including ground clutter, a triple interferometric signal processing unit 190 utilizes the information from the FFTs 144, 154, 164 and 174 and generates interferometric phase and amplitude calibration signals. Referring now to FIG. 8, one embodiment of the triple interferometric signal calibration processing unit 190 will now be described. The triple interferometric signal calibration processing unit is essentially composed of two halves, one which operates on the frequency domain return data from the left and center apertures. The second half operates on the delayed frequency domain data from the right and center apertures. First considering the left and center aperture signal processing, a complex multiplication unit 192 receives the signals on the line 150 and 152 which correspond to the in-phase(I) and quadrature(Q) portions of the range doppler map from the FFT processor 144 (FIG. 7). The complex multiplier routine 192 also receives the in-phase(I) and quadrature(Q) components of the center aperture range doppler map on the lines 170, 172. Each of the signals input to the complex multiplier 192 are derived from the undelayed data sets described above. The complex multiplier routine 192 takes two complex quantities and multiplies one by the complex conjugate of the other. The output from the complex multiplication unit 192 on lines 194, 196 is an in-phase(I) and quadrature(Q) range doppler map which represents the phase angle between the return signals of the left and center apertures.

Angle processor 198 receives the signals on the lines 194, 196 and performs a linear regression on the phase data in each range bin and derives a linear frequency versus angle relationship from each range bin. It then averages all the range data to derive a best estimate of angle versus doppler information. The output $\theta_{lc_i}$ from the angle processor 198 is provided on a line 200 and this signal represents the measured angle versus doppler interferometric characteristic for the interferometer formed by the left and center apertures. Note, double subscripts (e.g., $\theta_{lc_i}$) indicate the apertures utilized (left-center) to form the interferometer and the integer value i represents a doppler frequency index. Each half of the calibration unit also includes a magnitude detector, such as a magnitude detector 202 which measures the magnitude of the complex vectors in the range-doppler maps for the left and center apertures. The magnitude detector 202 receives the left aperture frequency domain signals on the lines 150, 152 along with the center channel frequency domain signals on the lines 170, 172. The output signals from the magnitude detector 202 are presented on lines 204 and 206 to an amplitude processor 208, and these signals represent the magnitude of the range doppler map from the left aperture and the range doppler map from the center aperture. The amplitude processor 208 computes the average clutter powers on the left and center apertures and provides an output signal $A_{lc}$ on a line 210 which is the ratio of the average clutter power of the left and center apertures.

In a similar manner, the other half of the triple interferometric signal calibration unit 190 includes a complex multiplication unit 212 which receives the time delayed range doppler map data from both the center and right apertures on the lines 160, 162, 180 and 182. An angle processor 218 provides an output signal $\theta_{cr_i}$ on a line 220 which represents the measured angle versus doppler characteristic for the interferometer formed by the center and right apertures. A magnitude detector 222 also receives range doppler map data from both the right and center apertures and provides range doppler magnitudes on lines 224, 226 to an amplitude processor 228. Similar to the amplitude processor 208 for the left and center aperture interferometer, the amplitude processor 228 provides a signal $A_{cr}$ on a line 230 which is the ratio of the average clutter power in the center and right apertures.

Figure 9:
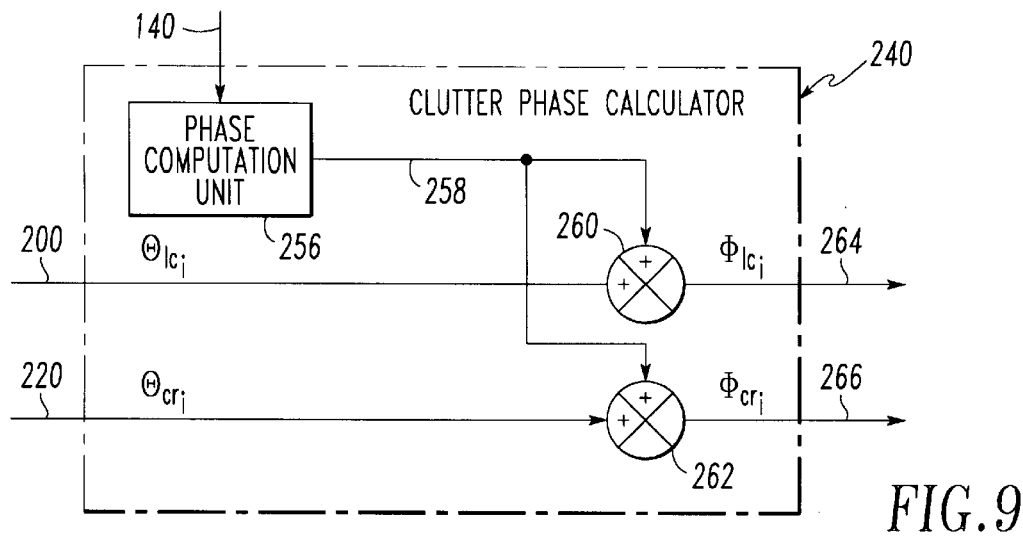
FIG. 9 is a block diagram of the clutter phase calculation routine of the clutter cancellation processing illustrated in FIG. 7.

FIG. 9 illustrates a clutter phase calculator routine 240 which calculates the phase correction to achieve optimum cancellation of the energy associated with the stationary objects including clutter. A phase computation unit 256 calculates the phase difference between the delayed and undelayed data sets described hereinabove and accepts as an input the time delay value N on line 140. The phase computation unit 256 generates on a doppler filter basis the phase value $2\pi N f_i \tau$ where $f_i$ is the doppler frequency for each doppler filter and $\tau$ is the radar pulse repetition interval (PRI). The output phase value on a line 258 is provided to the phase adders 260 and 262. At each of the phase adders, the interferometric phase correction signals $\theta_{lc_i}$ and $\theta_{cr_i}$ on the lines 200, 220 are combined with the signal on the line 258 to form a left/center aperture phase correction signal value $\phi_{lc_i}$ and a center/right aperture phase correction signal value $\phi_{cr_i}$. The phase correction values $\phi_{lc_i}$ and $\phi_{cr_i}$ provided on lines 264 and 266 respectively, represent the phase correction values that are required to achieve maximum clutter rejection (in the clutter region) and optimum moving target response (in the clutter-free region) characteristics. That is, $\phi_{lc_i}$ and $\phi_{cr_i}$ are composite signals representing a time delay phase correction, the positional phase relationship between adjacent interferometers and a phase due to motion of the assumed moving targets. In the clutter region, the resultant linear phase correction is significantly reduced by the use of the time delay feature, so that over a doppler filter width the phase deviation is small, allowing for a high degree of clutter cancellation across the whole filter. The next processing step is to apply the phase correction signal values $\phi_{lc_i}$ and $\phi_{rc_i}$.

Figure 10:
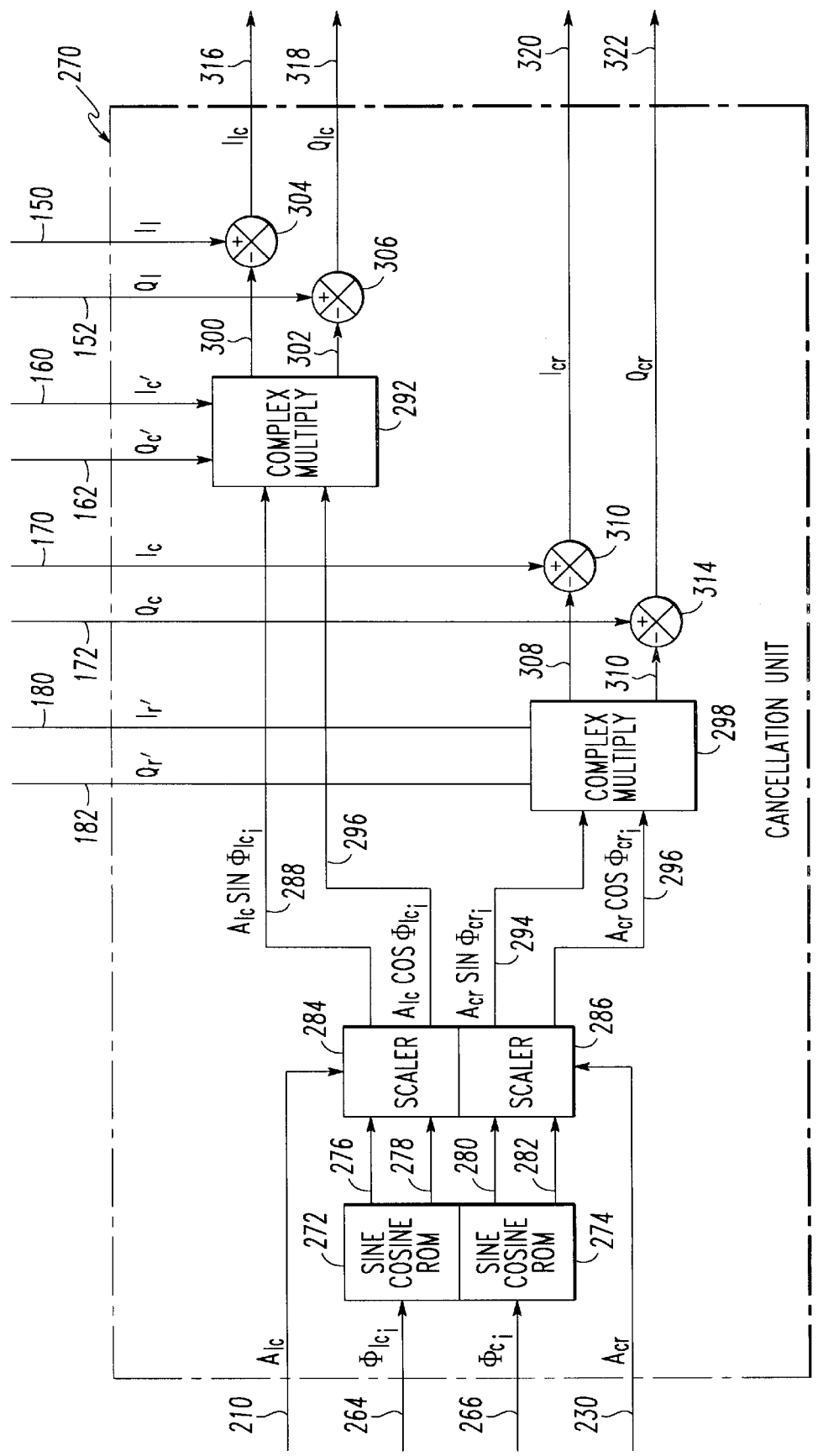
FIG. 10 illustrates a block diagram of the cancellation unit processing of the clutter cancellation processing illustrated in FIG. 7.

FIG. 10 illustrates a block diagram of a clutter cancellation routine 270. It should be understood that the signals on the lines 150, 152, 160, 162, 170, 172, 180 and 182 when presented to the cancellation routine 270 must be delayed for a predetermined period. The predetermined time delay corresponds to the combined processing time of the triple interferometric signal calibration unit 190 (FIG. 8) and the clutter phase calculator unit 240 (FIG. 9), prior to being combined in the cancellation unit 270. The phase correction signals on the lines 264, 266 are input to a sine-cosine ROM 272 and a sine-cosine ROM 274, respectively. The sine and cosine ROMs 272, 274 calculate the sine and cosine values corresponding to the phase angle they receive and provide signals indicative thereof on lines 276, 278, 280, 282 which represent $\sin(\phi_{lc_i})$, $\cos(\phi_{lc_i})$, $\sin(\phi_{cr_i})$ and $\cos(\phi_{cr_i})$ respectively. Scalers 284, 286 then multiply the sine and cosine terms by the amplitude correction terms on the lines 200 and 230 which relate to the amplitude difference in the clutter spectrums between adjacent interferometer apertures. The outputs from the scaling unit 284 are provided on lines 288 and 290 to a complex multiplication unit 292 while the output signals from the scaling unit 286 are provided on lines 294, 296 to complex multiplication unit 298. The signals on the lines 288, 290, 294 and 296 are the correction factors which are applied to the delayed data sets (i.e., subdwell data blocks) on the lines 160, 162 and 180, 182 respectively.

The delayed data sets on the lines 160, 162 and 180, 182 are complex multiplied in multiplier routines 292, 298 with their respective correction signal. The complex multiplier 292 accepts as inputs $I_{c'}$ and $Q_{c'}$ on the lines 160 and 162 respectively and the signals on the lines 288, 290. The complex multiplier 292 scales the vector represented by signal lines 160 and 162 by a factor $A_{lc}$ and rotates the vector by a phase angle amount $\phi_{lc_i}$ (note, the subscript i indicates segmentation in doppler frequency). A similar correction is applied to the signal information from the interferometer formed by the center and right apertures. The complex multiplier 298 receives the $I_{r'}$ and $Q_{r'}$ signals on lines 180 and 182 along with correction signals on the lines 294, 296. The complex multiplier routines 296 scales the vector represented by signals on the lines 180 and 182 by a factor $A_{cr}$ and rotates the vector by a phase angle amount $\phi_{cr_i}$.

The in-phase and quadrature signals $I_l$ and $Q_l$ on the lines 150, 152 are input to summing functions 304, 306 respectively which also receive the corrections on the lines 300 and 302 which represent corrected center aperture information. The summing functions 304, 306 compute the difference between the corrected center aperture information and the uncompensated left aperture information. The result of the summation is left/center aperture interferometric clutter canceled in-phase and quadrature information $I_{lc}$ and $Q_{lc}$ provided on lines 316 and 318. Similarly, summing function 310, 314 subtracts compensated right aperture information on the lines 308 and 310 from uncompensated center aperture information $I_c$ and $Q_c$ on lines 170 and 172. The result is center/right aperture interferometric clutter canceled in-phase and quadrature information $I_{cr}$ and $Q_{cr}$ provided on lines 320 and 322. At this point, the two output signal pairs $I_{lc}$, $Q_{lc}$ and $I_{cr}$, $Q_{cr}$ possess greatly enhanced signal characteristics which facilitates detecting, locating, tracking and imaging moving objects. That is, the clutter cancellation processing has significantly attenuated or canceled the clutter in the clutter region of the PRF and has optimized the moving target response in the clutter-free region of the PRF. The signals on the lines 316, 318, 320 and 322 can be processed to detect the slow moving objects which up until this point in the processing chain were masked in the energy from the stationary objects.

FIG. 11 illustrates a block diagram of a detection and validation processing routine 330. Clutter canceled interferometric signals $I_{lc}$ and $Q_{lc}$ (subdwell data blocks) on the lines 316, 318 are input to memory device 332. Similarly, clutter canceled interferometric signals $I_{cr}$ and $Q_{cr}$ on the lines 320, 322 are input to memory device 334. These memory units are sufficiently sized so that they contain information for $N_r$ range bins by $N_d$ doppler filters. At this point, we are ready to detect the moving objects which possess enhanced signal to clutter characteristics. Magnitude detectors 336, 338 each perform a conventional magnitude detection routine on the information stored in the bulk memory. The outputs of the both magnitude detectors on lines 340, 342 are then input to a map addition unit 344 which sums together the magnitudes for each corresponding range doppler cell location.

Vehicle detection is performed in a well known manner by determining if a signal level threshold is crossed. One such preferred detection technique employs a constant false alarm rate (CFAR) routine 348 having a threshold value which is adaptively varied. The CFAR routine 348 averages the power contained in a doppler cell over all range samples to set the detection threshold. This has the benefit that the threshold level value is a function of whether the moving vehicle is masked in clutter and the intensity of the clutter. In general, one of ordinary skill in the art will appreciate many detection routines can be used depending upon the system requirements and the processing ability of the particular system which employs the signal processing techniques disclosed herein to image ground moving vehicles.

The outputs of the memory devices 332 and 334 are also input to an angle calculation routine 352. The angle calculation routine 352 computes an angle to a moving object by complex multiplying the inputs to obtain complex signals from which the angle to the moving object can be derived. Included in the angle calculation unit 352 is an arc tangent ROM (not shown) which takes the in-phase(I) and quadrature(Q) information and derives an electrical phase angle value. The electrical phase angle is then scaled by an interferometer scale factor to give the true angular field position for all signals in the total map of $N_r$ range bins by $N_d$ doppler filters. The angle discrimination unit 356 receives doppler and angle information from the angle calculation unit 334 and evaluates the angular information of all signals against the known angle doppler interferometric relationship. A discrete window is provided about the known linear relationship and signals falling within the discrete window will be identified as stationary objects and rejected. Candidate moving objects falling outside the discrete window will be identified as potential moving targets and will pass to the target validation unit 360 on a signal line 358.

FIG. 12 illustrates an example of a discrete window 359 placed about a line 361 which represents the derived doppler versus azimuth relationship. Returning to FIG. 11, the target validation unit 360 correlates the detection of moving targets by comparing the results of the CFAR thresholding routine 348 against the results of the angle discriminate routine 356. The output of the target validation unit is a range value $r_t$ on a line 362 and a doppler frequency value $f_t$ on a line 364 for moving objects which have passed both the amplitude and angle criteria detection. The detection routine 330 also provides amplitude information on line 366 about each moving object, along with the moving object's angular location $\theta_t$ with respect to antenna boresite on a line 368. The subscript t indicates the respective detected moving vehicle.

Referring to FIG. 13, once the moving vehicles have been detected and located by routine 330 (FIG. 11), the next step to be performed is routine 390 which tracks the moving vehicles by correlating the detections from many subdwells to form the vehicle tracks. Since the continuous subdwells are adjacent and non-overlapping in time, by correlating the detections in each subdwell the moving vehicles can be tracked across the subdwells, hence over time. The correlation logic also allows for multiple detections within a single subdwell to be associated with the same vehicle. The tracking logic algorithm preferably associates vehicles in different subdwells based upon vehicle range, azimuth and velocity and other factors known in the art. However, other approaches for track association of detected tracks in subdwells may also be implemented depending upon the specific system design criteria (e.g., one approach may be to match vehicle motion to known roads). The tracking routine also provides an estimate of the moving vehicle's velocity. Now that the moving vehicles have been detected, located and are being tracked, an image of the moving vehicles can now be formed.

Figure 14:
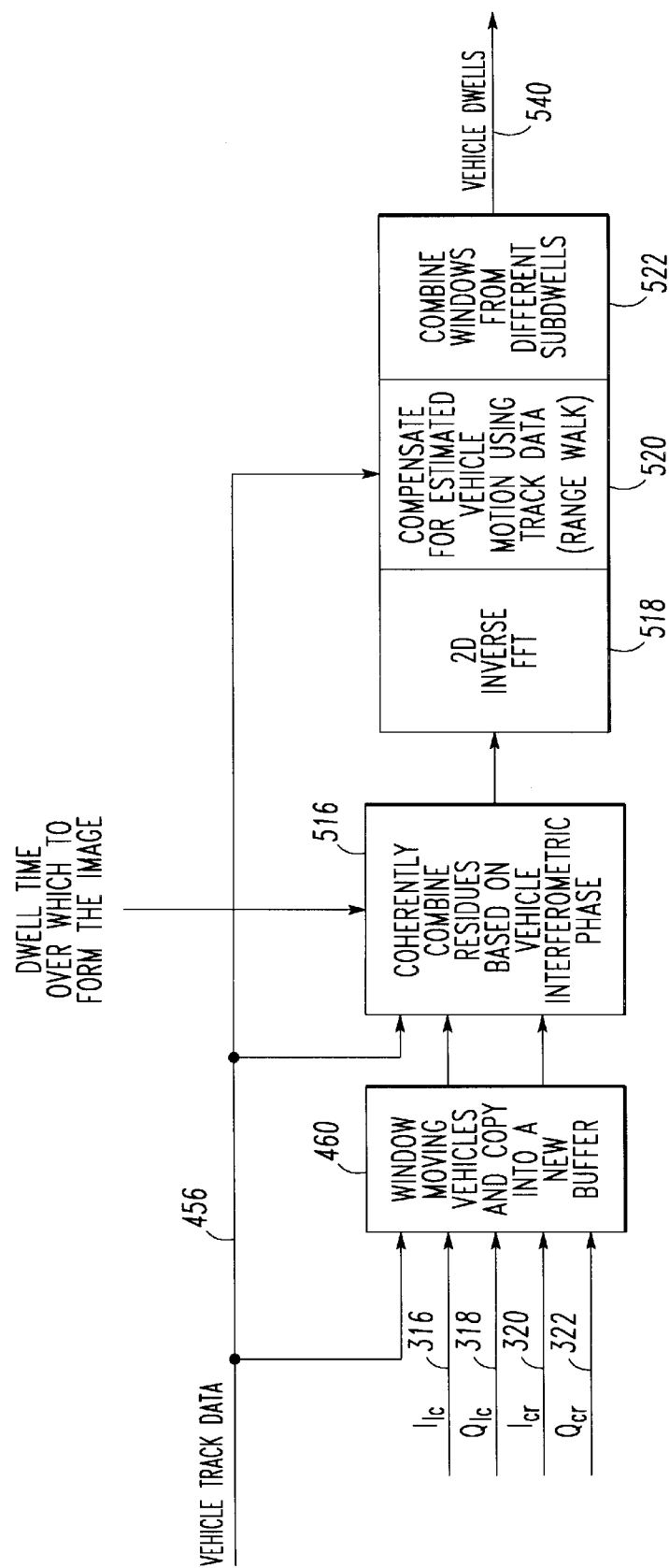
FIG. 14 is a functional block diagram of routines for imaging the moving vehicles.

The first step is to select detected moving vehicles for imaging. Referring to FIG. 14, routine 460 receives the moving vehicle track data on the line 456 and selects (i.e., "windows") the return signal information from the left/center interferometer on the lines 316, 318 and the right/center interferometer on the lines 320, 322 which correspond to the moving vehicles for further processing. Several different approaches for imaging ground moving vehicles may be used. The options include: imaging all moving vehicles in the SAR scene, imaging all movers detected (even those outside the area being displayed on the display), imaging only moving vehicles selected by the operator, or imaging movers based upon operator defined logic, etc. In an operational system it is currently believed that moving vehicles will be detected and tracked using a low resolution mode (e.g., ground moving target indicator mode). After identifying vehicles of interest, the operator would designate the moving vehicles to be imaged by the IMTF processing of the present invention. The notion of selecting or "windowing" the processed return data associated with selected moving vehicles is best understood using a pictorial illustration.

FIG. 15 illustrates a plurality of subdwell data blocks 500–505 for both the left/center range doppler map and the right/center range doppler map. As an example, for a dwell time of about 3 seconds, there may be three non-overlapping subdwell data blocks each containing one seconds worth of return data from many pulses. The subdwell data blocks 500–505 contain "windowed" regions 508–511 which correspond to two moving vehicles in the SAR scene 24 (FIG. 1). The energy in the left/center subdwells 500–502 related to the first moving vehicle is captured in the window 508. Similarly, the energy in the right/center subdwell 503–505 related to the first moving vehicle is captured in the window 510. The energy for the second moving vehicle in the SAR scene is captured in windows 509, 511 for the left/center and right/center subdwells respectively. Each "windowed" region 508–511 encompasses a plurality of pixels which provide information about the moving vehicle. Typically the size of the windowed region for each moving vehicle is less than one percent of the size of the subdwell data block. By extracting only the portion of the image containing moving vehicle energy, memory storage and processing load can be greatly reduced.

Referring now to FIGS. 14 and 15, once the "windowed" regions 508–511 for each moving vehicle has been removed/copied from both the subdwell data blocks, an appropriate dwell time over which the vehicle image will be formed is selected. In general, the dwell time selected will be based upon estimated vehicle dynamics and the imaging geometry. For vehicles that are moving in a straight line at a velocity much less than the velocity of the radar, which is generally the case, the dwell time would be equal to the dwell time for the SAR processing to allow square range-cross range pixels. If the vehicle is turning, the dwell time should be shortened to account for the increased angular rotation induced by the turn. Other causes for angular rotation of the vehicle can also affect the nature and quality of the output imagery.

After determining which moving vehicles to image and the appropriate dwell time for that vehicle, the next step is to begin forming the image of the moving vehicle. As discussed hereinbefore, the size of the vehicles in the various subdwells has been estimated and "windowed". Although not required, for ease of processing the same size window is preferably used for the same vehicle in the left/center and right/center data blocks and from one subdwell to the next. Routine 516 (FIG. 14) coherently combines the "windowed" regions from the left/center and right/center subdwell data blocks after premultiplying one of the data blocks by an appropriate complex phaser compensating for the vehicle's azimuth location (the measured iliterferometric phase). As an example, the "windowed" regions 508, 510 for vehicle #1 are coherently combined and the "windowed" regions 509, 511 for vehicle #2 are coherently combined. The result is a plurality of summed data blocks each indicative of a single vehicle over a certain temporal subdwell.

An inverse two dimensional FFT 518 transforms the summed data blocks to the frequency versus time domain to facilitate correcting for estimated target motion (i.e., range walk) in routine 520. Because the moving vehicle is moving relative to the center of the SAR scene 24 (FIG. 1), its range is changing during the dwell and therefore will result in backscattered energy indicative of the vehicle being placed in multiple range bins. Correcting for range walk is generally well known and involves compensating for target motion in range by placing target into the same range bin during the dwell. Routine 520 corrects for the vehicle's radial motion using information on the line 456 from the tracking logic. The vehicle's change in range as a function of dwell time is corrected by applying a linear phase taper in the frequency domain, where the slope of the taper changes versus time to compensate for the range walk during the dwell period. Data in the windowed frequency domain can now be thought of as "azimuth presumed" and "frequency presumed". "Azimuth presumed" because the data has a reduced sampling rate in the azimuth/slow-time domain (e.g. if the selected window size contains ⅛th the time domain information in comparison to the original subdwell data block (e.g., 500) the transformed windowed regions will have time steps eight times as large as the original data subdwells). Similarly, the data is "frequency presumed" because the data has a reduced sampling rate in the frequency domain. Because of the way the data is reduced all the energy associated with moving objects has been retained through the IMTF routine 111, while attenuating the energy from stationary objects and reducing the processor's memory requirements.

It should be noted that each summed "windowed" subdwell of a certain moving vehicle contains the same frequency content as all the other subdwells for the same moving vehicle. In addition, each summed "windowed" subdwell for a particular moving vehicle is contiguous and non-overlapping in time. Because of this relationship, the subdwells associated with a particular moving vehicle can be combined by routine 522 in adjacent temporal order in the azimuth (slow-time) domain to form an even longer coherent dwell on the moving vehicle. As an example, FIG. 16 illustrates a plurality of summed subdwells 530–533 for vehicle #1 joined together to form a longer dwell time of moving target data. Similarly, summed subdwells 534–537 are joined together for form a long dwell time of synthetic pulse corresponding to vehicle #2. Summed subdwell 530 may be thought of as the coherent summation of the windowed subdwells 508, 510 (FIG. 15) associated with the left/center and center/right subdwell data blocks respectively. Similarly summed subdwell 534 may be thought of as the coherent summation of the windowed subdwells 509, 511 (FIG. 15).

It should be noted that if non-overlapping contiguous subdwells are used to form the dwell and each window and subdwell are identical in size, then the synthetic pulses will also be contiguous and evenly spaced. By placing all the subdwell data in one contiguous buffer according to synthetic pulse number and synthetic range bin, a single long clutter-free dwell centered on the target of interest is formed. As an example, if each subdwell contains 0.5 seconds worth of radar return data, then combining three subdwells creates a dwell period of 1.5 seconds. One of ordinary skill will appreciate it is possible to use non-identical "window" sizes and non-identical subdwell sizes to achieve the same result (e.g., by interpolating to create evenly spaced synthetic pulses).

Figure 17:
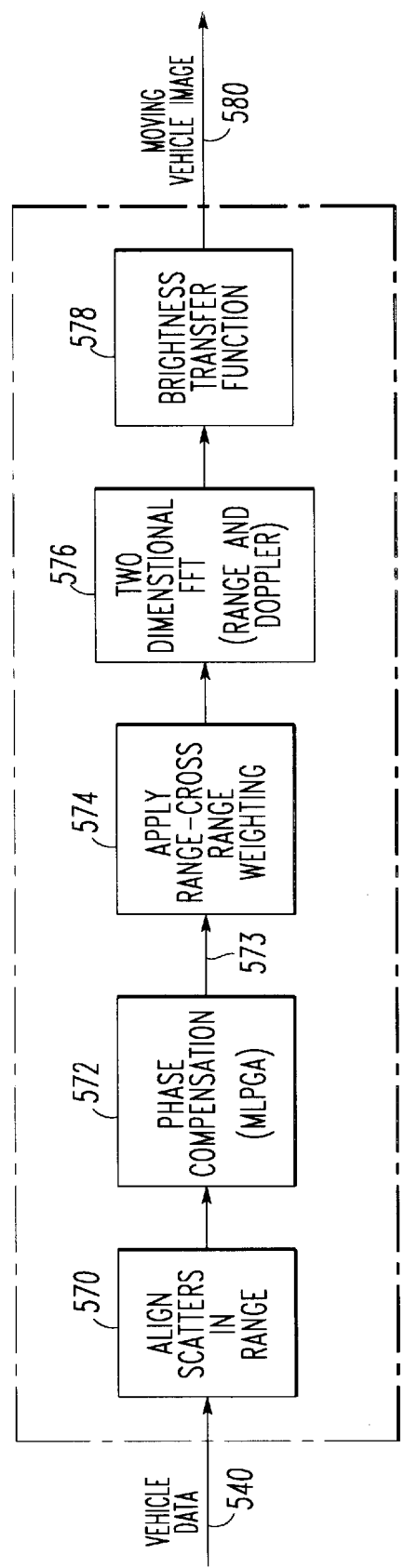
FIG. 17 illustrates a functional block diagram of additional routines for imaging the moving objects.

An image of the moving vehicles can now be formed. However, several more adaptive correction routines are first performed to further improve the location estimation of the moving vehicle(s) which enhances the quality of the image formed by the present invention. Referring to FIG. 17, the first correction is performed by routine 570 which compensates for uncorrected vehicle range walk during the dwell period. As described earlier, range walk occurs when energy from a moving vehicle is placed in different range bins during the coherent dwell due to the movement of the vehicle during the dwell time. This problem becomes more acute as dwell time increases and range resolution improves. A map drift correction can be used to further correct for range walk. The next processing step is routine 572 which corrects for residual phase errors using the known maximum likelihood phase gradient algorithm (MLPGA). For a detailed explanation of MLPGA see C. V. Jakowatz and D.

E. Wahl, "An Eigenvector Method for Maximum—Likelihood Estimation of Phase Errors in SAR," *Journal of the Optical Society of America*, Vol. 10, No. 12, December 1993. Other approaches for reducing the residual phase error include prominent point autofocusing and spatial correlation based approaches.

Additional correction routines may also be added to compensate for any vehicle rotation and the varying motion of a vehicle during the dwell period. For example, the cab of a semi-trailer will move differently than the back of the truck and therefore the image of the different portions of the truck may be focused using a different phase correction. Therefore, although two stages 570, 572 are currently shown, it is contemplated that more stages may be needed for complex targets and imaging scenarios (e.g., rotating targets and non-rigid target). In general, these additional steps may be easily added to the IMTF processing routine 111 (FIG. 3) disclosed herein.

Once the image data has been corrected for residual range walk and phase errors, the image data is input to a routine 574 which weights the data on line 573 to provide a low sidelobe point response function. The center of the radar cross section (RCS) mass of the moving object is also estimated and the center of the RCS mass is used to properly place the image in the SAR scene. A two dimensional FFT 576 is then performed to transform the data to the range doppler domain which forms an image of the moving vehicle. A brightness transfer function (BTF) 578 processes the range doppler image and an enhanced image of the moving objects is output on a line 580 for display. To contrast the moving and stationary objects on the display 62 (FIG. 3) the moving objects may be color coded to differentiate them from the stationary objects also displayed.

The discussion of IMTF has been tailored with the intent of showing how to create a composite image of the stationary and moving objects within a SAR scene. However, this is not the only benefit nor possible output of IMTF processing. One of the main reasons for performing IMTF is to aid in target classification and identification. Depending upon the nature of the selected automatic target recognition (ATR) system, different IMTF image products could be of interest. The main benefit of IMTF imaging of the present invention is its ability to collect and coherently process long RF (and conceptually laser) dwells on moving objects from a radar system whose phase center is moving while minimizing the disturbances caused by the clutter.

Although X, Ku band are preferred, one may also use other radar bands and even a laser radar system to image moving vehicles according to the present invention. In addition, although the signal processing of the present invention is preferably performed in software, the present invention may also be implemented in the discrete time domain using hardware or even in the continuous time domain. One of ordinary skill will also appreciate that the antenna used to implement the multi-aperture of the interferometer may be formed using a flat plate antenna, a phased array antenna, even a conformal phased array antenna or a parabolic antenna.

The imaging techniques of the present invention can also be used in a radar system having only two apertures albeit with degraded image quality in when the moving object is in clutter. That is, if the moving vehicles is not masked by heavy clutter, then an angle measurement may not be required to accurately estimate the azimuth location of the moving vehicle. Therefore, magnitude detection alone may provide sufficient criteria for detection of moving vehicles.

All foregoing changes and variations are merely different examples and embodiments of the interferometric moving target imaging system of the present invention which includes a plurality of simultaneously operating apertures, receivers and processing channels which together coherently process RF return signals to image a moving vehicle. The present invention includes a clutter cancellation routine which significantly attenuates competing clutter returns allowing slow moving objects to be detected even in the presence of ground. The true azimuth location of the moving object versus time is also computed which facilitates tracking the moving object through out the dwell period to correct for range walk. Once the range walk correction is performed by placing the return energy from the moving object during the dwell period in the same range bin, a range doppler image of the moving vehicle is formed.

Although the present invention has been shown and described with respect to a preferred embodiment thereof, it should be understood by those skilled in the art that various other changes, omissions, and additions may be made to the embodiments disclosed herein, without departing from the spirit and scope of the present invention.

What is claimed is:

1. A radar system which transmits a pulsed waveform from a multi-aperture antenna having at least three apertures and receives backscattered energy from stationary and moving objects illuminated by each of the apertures and processes the signals received by each aperture separately to provide a plurality of received signals which are pulse compressed, motion compensated and transformed to the range doppler domain to provide a plurality of compensated received signals which are processed to form images of the stationary and moving objects, the system comprising:

signal processing apparatus responsive to at least one of the plurality of compensated received signals for forming an image of the stationary objects; and interferometric moving target focusing apparatus which receives and partitions the compensated received signals for at least three of the apertures into temporal subdwell data blocks, and corrects said subdwell data blocks for the differences in the phase centers of their associated apertures, and interferometrically combines the subdwell data blocks to attenuate the return energy associated with stationary objects and provide a first clutter canceled data block and a second clutter canceled data block which are further processed to detect moving objects, by comparing the magnitude and phase angle of the various return signals in said first and second clutter canceled data blocks to detect the moving objects, and combining said first and second clutter canceled data blocks in the range doppler domain to form a range doppler image of the detected moving objects.

2. The radar system of claim 1 wherein said interferometric moving target focusing apparatus comprises:

apparatus responsive to a first aperture subdwell data block and a second aperture subdwell data block which computes a phase angle correction factor $\phi_{lc_i}$ and an amplitude correction factor $A_{lc}$ indicative of the difference between the data blocks;

apparatus responsive to said second aperture subdwell data block and a third aperture subdwell data block which computes a phase angle correction factor $\phi_{cr_i}$ and an amplitude correction factor $A_{cr}$ indicative of the difference between the data blocks;

apparatus responsive to said phase angle correction factor $\phi_{lc_i}$ and said amplitude correction factor $A_{lc}$ for correcting the first aperture subdwell data block such that it is aligned in time with the second aperture subdwell data and for providing first aperture corrected subdwell data block;

apparatus responsive to said phase angle correction factor $\phi_{cr_i}$ and said amplitude correction factor $A_{cr}$ for correcting said third aperture subdwell data block to align in time with the second aperture subdwell data and for providing a third aperture corrected subdwell data block;

a first summer for computing the difference between said first aperture corrected subdwell data and the second aperture subdwell data and providing said first clutter canceled subdwell data block indicative of the difference;

a second summer for computing the difference between said third aperture corrected subdwell data and said second aperture subdwell data block and providing said second clutter canceled subdwell data block indicative of the difference; and a detection and validation processor which processes said first and second clutter canceled data blocks to detect the moving objects based upon return signal magnitude and phase angle criteria.

3. The radar system of claim 2 wherein said interferometric moving target focusing apparatus further comprises apparatus responsive to said first and second clutter canceled subdwell data blocks for windowing the detected moving objects in each of said subdwell data blocks and for providing windowed range doppler data blocks for each of the detected moving objects;

apparatus which coherently combines the windowed range doppler data blocks for each moving object from said first and second clutter canceled subdwell data blocks and provides a summed data block for each of the detected moving targets;

apparatus for performing an inverse two dimensional FFT to transform said summed data blocks into the time frequency domain and for providing a transformed data blocks indicative thereof; and apparatus for motion compensating said transformed data blocks to correct for range walk during the dwell period and for providing range walk compensated data blocks indicative thereof.

4. The radar system of claim 3 wherein said interferometric moving target focusing apparatus further comprises apparatus for performing a two dimensional FFT on said range walk compensated data blocks to transform to the range doppler domain to form said range doppler image.

5. The radar system of claim 3 wherein said interferometric moving target focusing apparatus further comprises apparatus for combining temporally adjacent range walk compensated data blocks to provide longer dwell times of processed data blocks of radar return data; and apparatus for performing a two dimensional FFT on said processed data blocks to transform to the range doppler domain which forms said range doppler image, wherein the doppler resolution of the range doppler image is improved by combining more range walk compensated data blocks for longer dwell times.

6. The radar system of claim 5 wherein said dwell period of time is about 0.1 seconds to about 10 seconds or more and each temporal subdwell is about 0.025 seconds to about 1 second.

7. The radar system of claim 6 wherein said detection and validation processor further comprises detection apparatus which uses a constant false alarm thresholding to detect moving objects.

8. The radar system of claim 5 wherein said radar system is an airborne system which provides images of ground moving vehicles in real-time.

9. The radar system of claim 8 wherein said signal processing apparatus is a synthetic aperture radar system.

10. The radar system of claim 8 wherein said interferometric moving vehicle imaging system includes an azimuth angle vehicle detection apparatus (356) which compares the doppler frequency of the signal return data against a certain detection threshold value which varies as a function of the azimuth location of the moving vehicle associated with the signal return data.

11. The radar system of claim 10 wherein said azimuth angle vehicle detection apparatus comprises an angle calculation apparatus responsive to said first and second clutter canceled subdwell data signals for computing an azimuth angle value $\theta_t$ and doppler frequency value $f_t$ to each detected vehicle which are then compared against a known doppler frequency versus azimuth angle relationship to determine if the detected moving vehicles are indeed moving.

12. The radar system of claim 11 wherein said apparatus for combining temporally adjacent range walk compensated data blocks also includes a phase compensation apparatus which corrects for residual phase errors to reduce the residual phase errors in said processed data blocks.

13. The radar system of claim 12 wherein said phase compensation apparatus comprises a maximum likelihood phase gradient processing routine.

14. A method of imaging a ground moving vehicle using an airborne interferometric synthetic aperture radar system having at least three apertures which each provides a received RF return signal over a certain dwell period to its own dedicated receiver channel which digitizes the received RF signal to provide a received digitized RF signal from each channel, the method comprising the steps of:

A) processing the received digitized RF signal from each aperture by
1) motion compensating each of the received digitized RF signals to correct for aircraft motion during the dwell period and provide motion compensated RF signals;
2) storing each of said motion compensated RF signals during the dwell period to form a plurality of temporal subdwell data blocks of return data each non-overlapping and adjacent in time;
3) performing a two dimensional FFT on the temporal subdwell data blocks from each of the apertures to transform to the range doppler domain and providing transformed temporal subdwell data block indicative thereof;

B) compensating the transformed temporal subdwell data blocks from two of the apertures such that the transformed temporal subdwell data blocks from all three of the apertures have the same phase center;

C) interferometrically combining corresponding transformed temporal subdwell data blocks for a first set of apertures selected from the three apertures to provide a first clutter canceled subdwell data block, wherein interferometrically combining the subdwell data blocks cancels the energy from stationary objects;

D) interferometrically combining corresponding transformed temporal subdwell data blocks for a second set of apertures selected from the three apertures provide a second clutter canceled subdwell data block;

E) processing the first and second clutter canceled subdwell data blocks to detect moving vehicles;

F) determining the location of the detected moving vehicles;

G) tracking the detected moving vehicles; and

H) imaging the detected moving vehicles and providing a range doppler image of each moving vehicle.

15. The method of claim 14 wherein the step of compensating the transformed temporal subdwell data blocks from two of the apertures includes the steps of calculating a phase angle correction factor $\phi_{lc_i}$ and an amplitude correction factor $A_{lc}$ based upon the data from the first set of apertures;

applying the correction factors $\phi_{lc_i}$ and $A_{lc}$ to the subdwell data blocks from a first aperture of the first set of apertures, to provide a first aperture corrected subdwell data block such that the subdwell data blocks from both apertures of the first set have the same phase center;

calculating a phase angle correction factor $\phi_{cr_i}$ and an amplitude correction factor $A_{cr}$ based upon the data from the second set of apertures; and applying the correction factors $\phi_{cr_i}$ and $A_{cr}$ to the subdwell data blocks from a third aperture of the second set of apertures, to provide a third aperture corrected subdwell data block such that the subdwell data blocks from both apertures of the second set have the same phase center.

16. The method of claim 15 wherein the step of interferometrically combining corresponding transformed temporal subdwells comprises the steps of computing the difference between the first aperture corrected subdwell data block and the second aperture subdwell data block and providing said first clutter canceled subdwell data block indicative of the difference.

17. The method of claim 16 wherein the step of interferometrically combining corresponding transformed temporal subdwells comprises the steps of computing the difference between the third aperture corrected subdwell data block and the second aperture subdwell data block and providing said second clutter canceled subdwell data block indicative of the difference.

18. The method of claim 17 wherein the step of processing the first and second clutter canceled subdwell data blocks to detect moving vehicles comprises the steps of determining the magnitude of the return signal energy in each range doppler cell for both the first and second clutter canceled subdwell data blocks;

combining the magnitude values for each corresponding cell location of the first and second clutter canceled subdwell data blocks to form a summed magnitude detection subdwell data block;

processing the summed magnitude detection subdwell data block information in a constant false alarm detection routine to detect possible moving vehicles based upon magnitude criteria;

processing the first and second clutter canceled subdwell data blocks to detect possible moving vehicles based upon angle criteria; and validating the possible detected moving targets detected by magnitude and angle criteria to detect true moving vehicles and provide angular location $\theta_t$ of each true moving vehicles along with a doppler frequency value $f_t$, amplitude value $a_t$, and a range value $r_t$ for each true moving vehicle.

19. The method of claim 18 wherein the step of imaging further comprises the steps of:

windowing the true moving objects in each both the first and second clutter canceled subdwell data blocks and providing windowed range doppler data blocks for each of the true moving objects;

coherently combining the windowed range doppler data blocks for each true moving object from the first and second clutter canceled subdwell data blocks and providing a summed data block for each of the true moving vehicles;

performing an inverse two dimensional FFT to transform said summed data blocks into the time frequency domain and for providing transformed data blocks indicative thereof; and motion compensating said transformed data blocks to correct for range walk and providing range walk compensated data blocks indicative thereof.

20. The method of claim 19 wherein the step of imaging further comprises the steps of:

combining temporally adjacent range walk compensated data blocks to provide longer dwell times of processed data blocks of radar return data; and performing a two dimensional FFT on said processed data blocks to transform to the range doppler domain which forms said range doppler image, wherein the doppler resolution of the range doppler image is improved by combining more range walk compensated data blocks for longer dwell times.

21. The method of claim 20 wherein following the step of combining temporally adjacent range walk compensated data blocks to provide the processed data blocks, the step of imaging further comprises a step of phase compensating the data in the processed data blocks to reduce residual phase error prior to the step of performing a two dimensional FFT.

22. The method of claim 21 wherein the step of phase compensating includes the step of applying a maximum likelihood phase gradient algorithm processing routine to reduce the residual phase error.

23. The method of claim 20 wherein the steps of the present invention are performed in real-time to provide real-time imagery of the true moving objects.

24. An interferometric ground moving vehicle imaging radar system which transmits a pulsed waveform from an antenna having at least three apertures and receives backscattered energy from stationary and moving objects at each of the apertures and processes the signals received by each aperture separately to provide a plurality of received signals which are motion compensated and transformed to the range doppler domain to provide a plurality of compensated received signals which are processed to form images of moving vehicles, the system comprising:

means responsive to each of the motion compensated signals for interferometrically attenuating the energy associated with the stationary objects to provide two clutter canceled signals with improved moving vehicle signal to noise ratio;

means responsive to said two clutter canceled signals for detecting and locating moving vehicles;

means for determining the azimuth location for each detected vehicle based upon the interferometric phase of the return signals;

means for tracking the detected moving vehicles and for providing track file information indicative of the moving vehicles movement;

means for coherently combining said clutter canceled signals to provide a coherent sum;

means for correcting the return signals in said coherent sum for range walk of the moving vehicles using said track file information and for providing a range walk corrected coherent sum; and means for processing said range walk corrected coherent sum to form an image of the moving objects.

25. The interferometric ground moving vehicle imaging radar system of claim 24 wherein said means for processing comprises means for performing a two dimensional FFT on said range walk corrected coherent sum to transform the signal into the range doppler domain to form a range doppler image of the detected moving vehicles.

26. The interferometric ground moving vehicle imaging radar system of claim 24 wherein said means for interferometrically combining comprises means, responsive to a first motion compensated subdwell data block from the first aperture and a second motion compensated subdwell data block from the second aperture, for computing a phase angle correction factor $\phi_{lc_i}$ and an amplitude correction factor $A_{lc}$ indicative of the difference between the data blocks;

means responsive to said second motion compensated subdwell data block and a third motion compensated subdwell data block from the third aperture for computing a phase angle correction factor $\phi_{cr_i}$ and an amplitude correction factor $A_{cr}$ indicative of the difference between the data blocks;

means responsive to said phase angle correction factor $\phi_{lc_i}$ and said amplitude correction factor $A_{lc}$ for correcting the first motion compensated subdwell data block such that it is aligned in time with the second motion compensated subdwell data block and for providing first aperture corrected subdwell data block;

means responsive to said phase angle correction factor $\phi_{cr_i}$ and said amplitude correction factor $A_{cr}$ for correcting said third motion compensated subdwell data block to align in time with the second motion compensated subdwell data block and for providing a third aperture corrected subdwell data block;

means for computing the difference between said first aperture corrected subdwell data and said second motion compensated subdwell data block and for providing said first clutter canceled subdwell data block indicative of the difference; and means for computing the difference between said third aperture corrected subdwell data block and said second motion compensated subdwell data block and for providing said second clutter canceled subdwell data block indicative of the difference.

27. The interferometric ground moving vehicle imaging radar system of claim 24 further comprising means responsive to said first and second clutter canceled subdwell data blocks for windowing the detected moving vehicles in each of said subdwell data blocks and for providing windowed range doppler data blocks for each of the detected moving vehicles;

means for coherently combining the windowed range doppler data blocks for each moving vehicle from said first and second clutter canceled subdwell data blocks and for providing a summed data block for each of the detected moving vehicles; and means for performing an inverse two dimensional FFT to transform said summed data block s into the time frequency domain and for providing transformed data blocks indicative thereof.

28. The interferometric ground moving vehicle imaging radar system of claim 27 wherein said means for processing comprises means for applying a applying a maximum likelihood phase gradient algorithm processing routine to said transformed data blocks to reduce the residual phase error and for providing a reduced phase error transformed data block; and means for performing a two dimensional FFT on said reduced phase error transformed data block to transform the data to the range doppler domain to form the image of the detected moving vehicles.

29. The interferometric ground moving vehicle imaging radar system of claim 28 wherein said means for detecting and locating moving vehicles includes means for detecting possible moving vehicles using a magnitude detection criteria;

means for detecting possible moving vehicles based upon the objects doppler frequency value as a function of the azimuth angle location of the object with respect to antenna boresite; and means for validating detected moving vehicles based upon return signal magnitude and phase angle criteria.

\* \* \* \* \*